US012623458B2

(12) United States Patent
Watanabe

(10) Patent No.: US 12,623,458 B2
(45) Date of Patent: May 12, 2026

(54) METHOD FOR CLEANING LIQUID EJECTING HEAD

(71) Applicant: SEIKO EPSON CORPORATION, Tokyo (JP)

(72) Inventor: Shunsuke Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 18/434,085

(22) Filed: Feb. 6, 2024

(65) Prior Publication Data

US 2024/0262105 A1 Aug. 8, 2024

(30) Foreign Application Priority Data

Feb. 7, 2023 (JP) ................................. 2023-017137

(51) Int. Cl.
*B41J 2/165* (2006.01)
*B41J 2/14* (2006.01)

(52) U.S. Cl.
CPC ....... *B41J 2/16552* (2013.01); *B41J 2/14233* (2013.01); *B41J 2002/16567* (2013.01); *B41J 2202/07* (2013.01)

(58) Field of Classification Search
CPC ................ B41J 2/16552; B41J 2/14233; B41J 2002/16567; B41J 2202/07
See application file for complete search history.

(56) References Cited

U.S. PATENT DOCUMENTS

2015/0217572 A1* 8/2015 Ohnishi ............... B41J 2/17556 347/28
2019/0291419 A1 9/2019 Yamada et al.

FOREIGN PATENT DOCUMENTS

JP 2003-266719 A 9/2003
JP 2019-166767 A 10/2019

* cited by examiner

*Primary Examiner* — Jason S Uhlenhake
(74) *Attorney, Agent, or Firm* — WORKMAN NYDEGGER

(57) ABSTRACT

There is provided a method for cleaning a liquid ejecting head including a nozzle plate in which a nozzle configured to eject a liquid is formed, a pressure chamber communicating with the nozzle, a vibration plate that defines a part of the pressure chamber, and a piezoelectric element that is laminated on the vibration plate, the method including: an ultrasonic cleaning step of ultrasonically vibrating a cleaning liquid in a cleaning tank by an ultrasonic vibrator in a state where the nozzle is immersed in the cleaning liquid in the cleaning tank and in a state where a gas is present in the pressure chamber.

9 Claims, 12 Drawing Sheets

METHOD FOR CLEANING LIQUID EJECTING HEAD

The present application is based on, and claims priority from JP Application Serial Number 2023-017137, filed Feb. 7, 2023, the disclosure of which is hereby incorporated by reference herein in its entirety.

BACKGROUND

1. Technical Field

The present disclosure relates to a method for cleaning a liquid ejecting head that ejects a liquid, and particularly to a method for cleaning an ink jet type recording head that ejects ink as a liquid.

2. Related Art

An ink jet type recording head, which is an example of a liquid ejecting head, includes, for example, a pressure generation unit that causes a pressure change in ink in a pressure generation chamber on a flow path forming substrate provided with a pressure generation chamber communicating with a nozzle, and by drive of this pressure generation unit, a vibration plate that defines a pressure generation chamber is deformed to cause a pressure change in the ink within the pressure chamber, thereby causing ink droplets to be ejected from the nozzle.

As a pressure generation unit, a liquid ejecting head using a vibration plate and a piezoelectric element in which a first electrode, a piezoelectric body layer, and a second electrode are laminated on the vibration plate by a film formation and lithography method was proposed (for example, refer to JP-A-2019-166767).

Moreover, a method is proposed in which, in a state where the nozzle of the liquid ejecting head is immersed in a cleaning liquid in a cleaning tank, by ultrasonically vibrating the cleaning liquid, the area around the nozzle of the liquid ejecting head is cleaned (for example, refer to JP-A-2003-266719).

However, when the liquid ejecting head having the piezoelectric element disclosed in JP-A-2019-166767 is cleaned by the cleaning method of JP-A-2003-266719, there is a problem in that the vibration plate and the piezoelectric element may be damaged by ultrasonic vibration.

Such a problem is not limited to the method for cleaning the ink jet type recording head that ejects the ink, and is also similar to the liquid ejecting head that ejects the liquid other than ink.

SUMMARY

According to an aspect of the present disclosure, there is provided a method for cleaning a liquid ejecting head including a nozzle plate in which a nozzle for ejecting a liquid is formed, a pressure chamber communicating with the nozzle, a vibration plate that defines a part of the pressure chamber, and a piezoelectric element that is laminated on the vibration plate, the method including: an ultrasonic cleaning step of ultrasonically vibrating a cleaning liquid in a cleaning tank by an ultrasonic vibrator in a state where the nozzle is immersed in the cleaning liquid in the cleaning tank and in a state where a gas is present in the pressure chamber.

DESCRIPTION OF EMBODIMENTS

Figure 1:
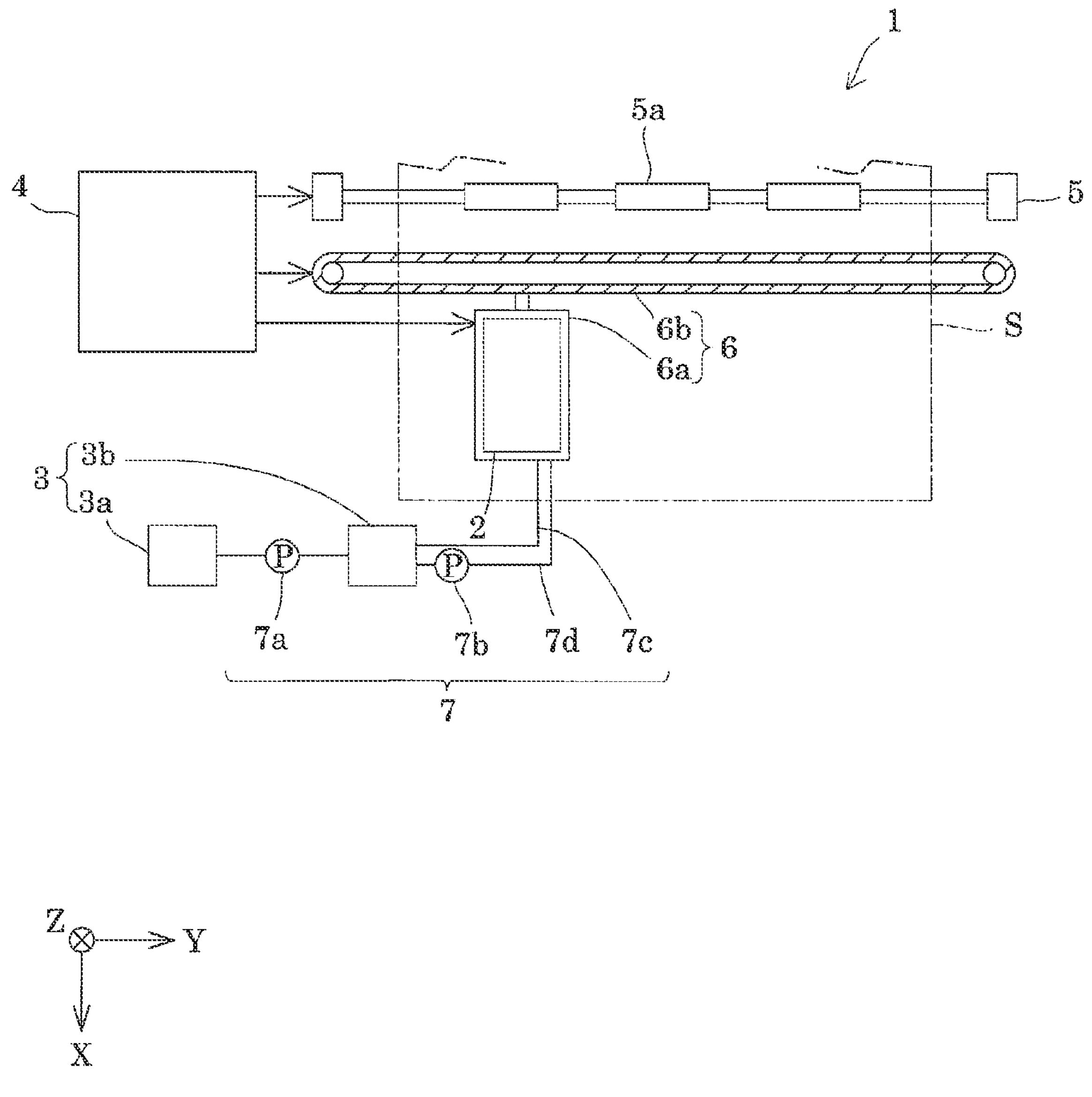
FIG. 1 is a view illustrating a schematic configuration of a liquid ejecting apparatus according to Embodiment 1.

Hereinafter, the present disclosure will be described in detail based on embodiments. However, the following description shows one aspect of the present disclosure, and can be changed in any manner within the scope of the present disclosure. Those having the same reference numerals in each drawing indicate the same members, and the description thereof will be omitted as appropriate. In each of the drawings, X, Y, and Z represent three spatial axes orthogonal to each other. In the present specification, the directions along these axes are the X direction, the Y direction, and the Z direction. The direction in which the arrows in each drawing are oriented is described as the positive (+) direction, and the opposite direction of the arrows is described as the negative (−) direction. In addition, the directions of the three spatial axes that do not limit the positive direction and the negative direction will be described as the X-axis direction, the Y-axis direction, and the Z-axis direction.

Embodiment 1

FIG. 1 is a view illustrating a schematic configuration of a liquid ejecting apparatus 1 according to the present disclosure.

As illustrated in the drawing, the liquid ejecting apparatus 1 is an ink jet type recording apparatus that causes ink, which is one type of liquid, to be ejected and land on a medium S such as a printing paper sheet as ink droplets, and prints an image or the like based on an arrangement of dots formed on the medium S. As the medium S, any material such as a resin film or cloth can be used in addition to a recording paper sheet.

The liquid ejecting apparatus 1 includes a liquid ejecting head 2, a liquid storage section 3, a control unit 4 which is a control section, a transport mechanism 5 that feeds out a medium S, and a movement mechanism 6.

The liquid ejecting head 2 ejects the ink supplied from the liquid storage section 3 onto the medium S from a plurality of nozzles. The detailed configuration of the liquid ejecting head 2 will be described later.

The liquid storage section 3 stores the ink ejected from the liquid ejecting head 2. Examples of the liquid storage section 3 include a cartridge that can be attached to and detached from the liquid ejecting apparatus 1, a bag-like ink pack formed of a flexible film, an ink tank that can be refilled with ink, and the like. It should be noted that, although not particularly illustrated, a plurality of types of ink having different colors or components are individually stored in the liquid storage section 3.

In the present embodiment, the liquid storage section 3 has a main tank 3*a* and a sub tank 3*b* for each type of ink. The sub tank 3*b* is coupled to the liquid ejecting head 2, and the sub tank 3*b* is refilled with the ink consumed by ejecting the ink droplets from the liquid ejecting head 2 from the main tank 3*a*. It is needless to say that the liquid storage section 3 maybe configured by only the main tank 3*a*.

The liquid ejecting apparatus 1 includes a circulation mechanism 7 for circulating the ink between the liquid ejecting head 2 and the sub tank 3*b*.

The circulation mechanism 7 includes a supply pump 7*a*, a circulation pump 7*b*, the sub tank 3*b*, a recovery tube 7*c*, and a supply tube 7*d*.

The supply pump 7*a* is a pump that supplies the ink stored in the main tank 3*a* to the sub tank 3*b*. The circulation pump 7*b* is a pump for supplying, that is, pressure-feeding the ink stored in the sub tank 3*b* to the liquid ejecting head 2.

The recovery tube 7*c* is a member that is not used for printing in the liquid ejecting head 2 and forms a flow path of ink recovered in the sub tank 3*b*. The supply tube 7*d* is a member that forms a flow path of the ink that is supplied from the sub tank 3*b* to the liquid ejecting head 2.

The sub tank 3*b* is a container that temporarily stores the ink supplied from the liquid storage section 3. In addition, the sub tank 3*b* is not used for printing in the liquid ejecting head 2, and temporarily stores the ink recovered through the recovery tube 7*c*.

In the circulation mechanism 7, ink is supplied from the sub tank 3*b* to the liquid ejecting head 2 through the supply tube 7*d* by the circulation pump 7*b*, and ink that is not used in the liquid ejecting head 2 is recovered into the sub tank 3*b* through the recovery tube 7*c*. As a result, the ink circulates between the liquid ejecting head 2 and the sub tank 3*b*. Further, when the amount of ink stored in the sub tank 3*b* is equal to or less than a certain amount, the ink is supplied from the main tank 3*a* to the sub tank 3*b* by the supply pump 7*a*.

The control unit 4 includes a control device such as a central processing unit (CPU) or a field programmable gate array (FPGA), and a storage device such as a semiconductor memory. The control unit 4 totally controls each element of the liquid ejecting apparatus 1, that is, the liquid ejecting head 2, the transport mechanism 5, the movement mechanism 6, and the like by executing the program stored in the storage device by the control device.

The transport mechanism 5 transports the medium S in the X-axis direction, and has a transport roller 5*a*. That is, the transport mechanism 5 transports the medium S in the X-axis direction by rotating the transport roller 5*a*. The transport mechanism 5 that transports the medium S is not limited to the one including the transport roller 5*a*, and may transport the medium S by a belt or a drum.

The movement mechanism 6 includes a transport body 6*a* and a transport belt 6*b*. The transport body 6*a* is a substantially box-shaped structure for accommodating the liquid ejecting head 2, a so-called carriage, and is fixed to the transport belt 6*b*. The transport belt 6*b* is an endless belt erected along the Y-axis direction. The transport belt 6*b* is rotated by the drive of a transport motor (not illustrated). The control unit 4 rotates the transport belt 6*b* by controlling the drive of the transport motor to reciprocate the liquid ejecting head 2 together with the transport body 6*a* in the Y-axis direction along a guide rail (not illustrated). The sub tank 3*b* of the liquid storage section 3 can also be mounted on the transport body 6*a* together with the liquid ejecting head 2.

Figure 7:
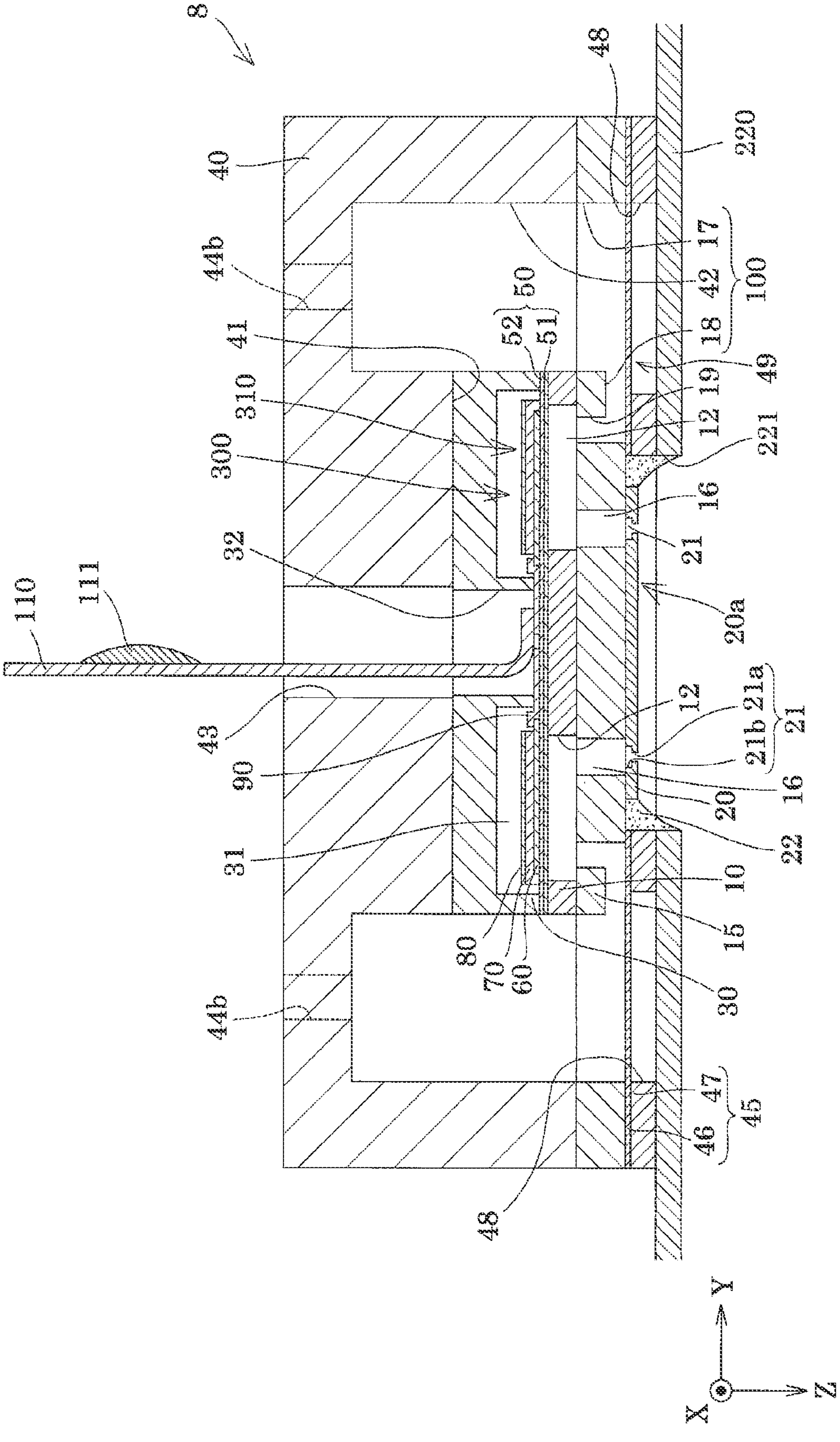
FIG. 7 is a cross-sectional view of the head chip and a cover head according to Embodiment 1.

Under the control of the control unit 4, the liquid ejecting head 2 executes an ejection operation of ejecting the ink supplied from the liquid storage section 3 in the +Z direction as ink droplets from each of a plurality of nozzles 21 (refer to FIG. 7). The ejection operation of ink droplets by the liquid ejecting head 2 is performed in parallel with the transport of the medium S by the transport mechanism 5 and the reciprocating movement of the liquid ejecting head 2 by the movement mechanism 6, and accordingly, an image is formed by ink on the surface of the medium S, that is, a so-called printing operation is performed.

Figure 2:
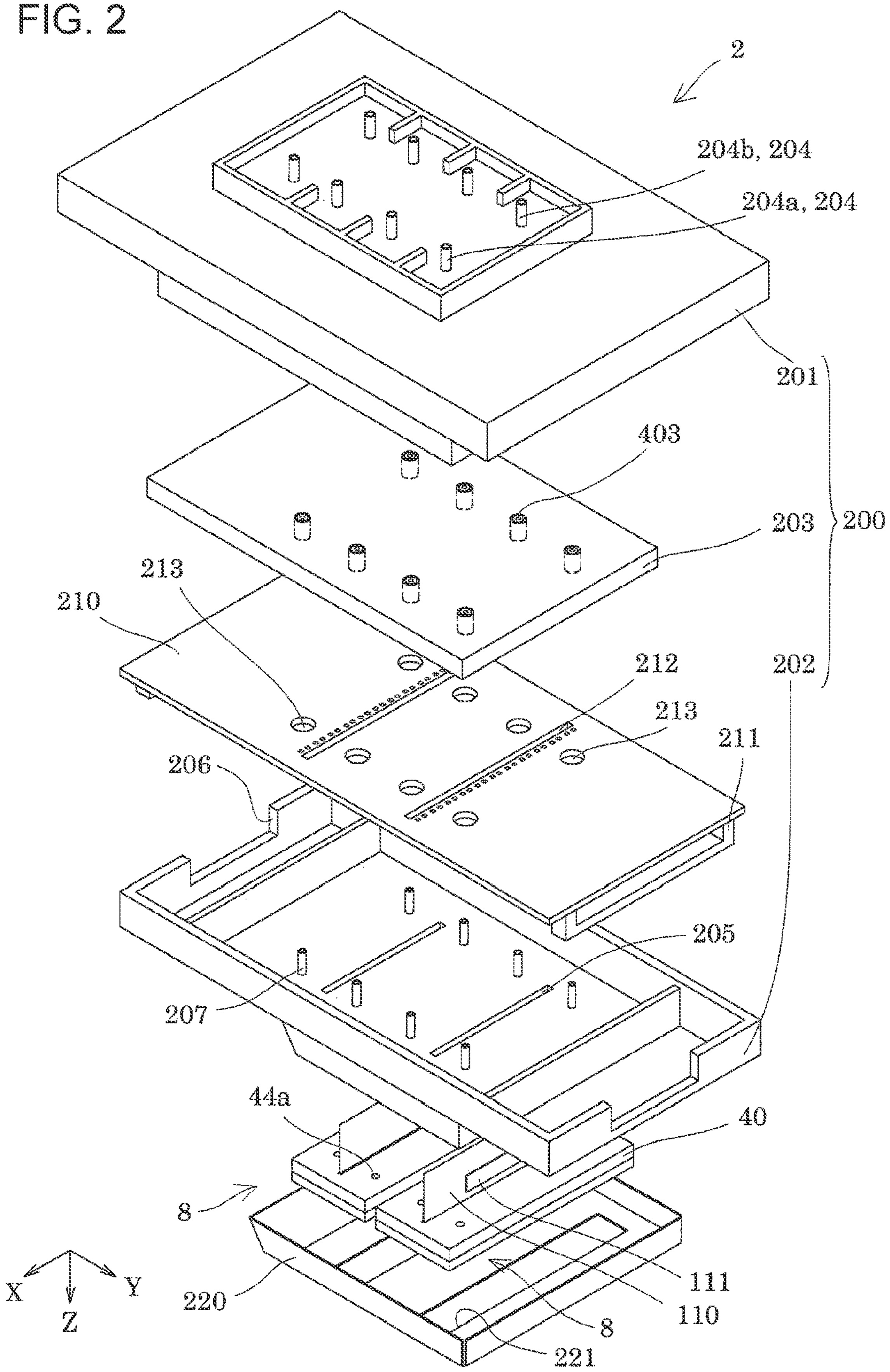
FIG. 2 is an exploded perspective view of a liquid ejecting head according to Embodiment 1.
Figure 3:
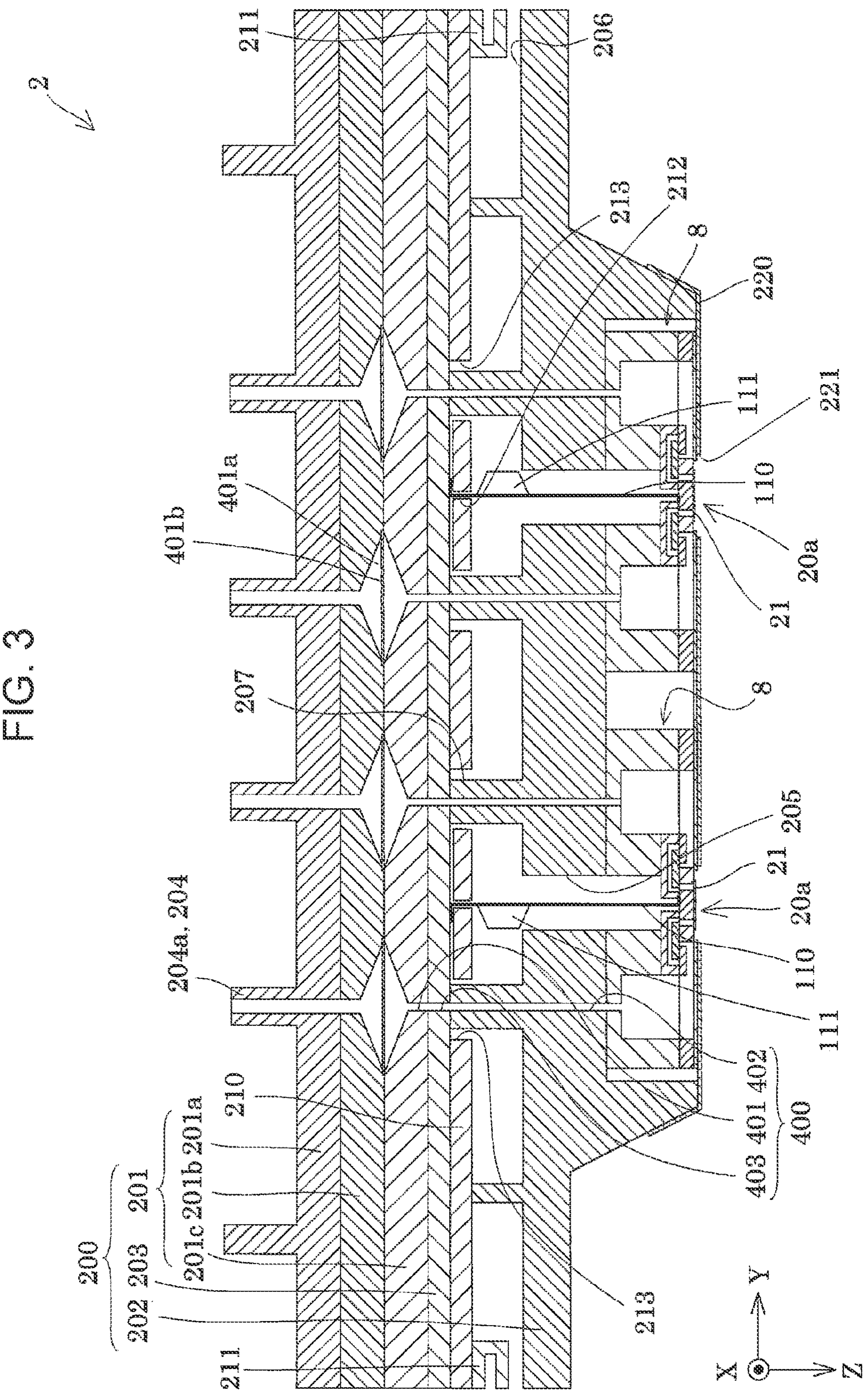
FIG. 3 is a cross-sectional view of the liquid ejecting head according to Embodiment 1.
Figure 4:
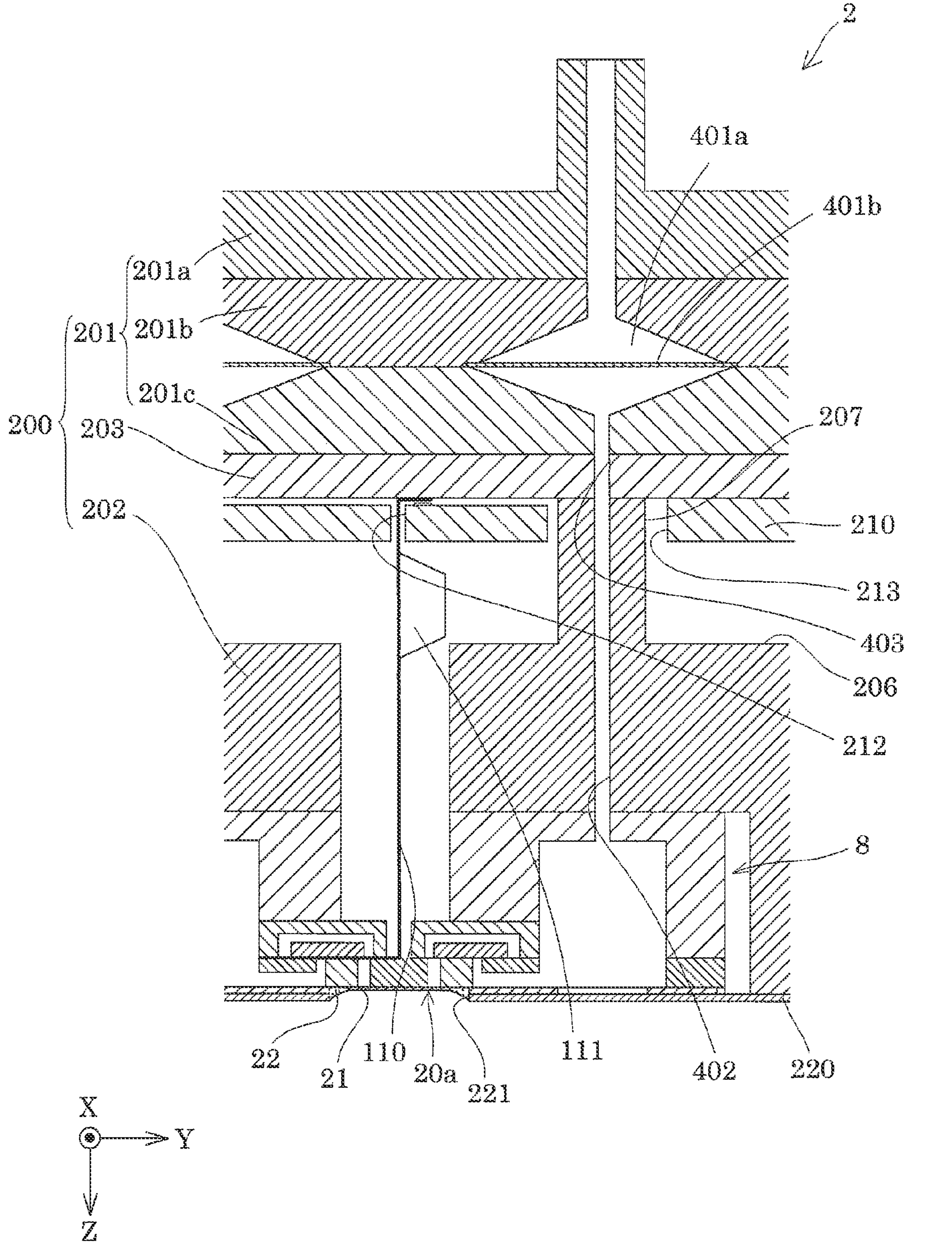
FIG. 4 is an enlarged cross-sectional view of a main portion of the liquid ejecting head according to Embodiment 1.

The liquid ejecting head 2 will be described with reference to FIGS. 2 to 4. FIG. 2 is an exploded perspective view of the liquid ejecting head 2. FIG. 3 is a sectional view of the liquid ejecting head 2. FIG. 4 is an enlarged sectional view of the main portion of FIG. 3. Each direction of the liquid ejecting head 2 will be described based on the directions when mounted on the liquid ejecting apparatus 1, that is, the X-axis direction, the Y-axis direction, and the Z-axis direction. Naturally, the position of the liquid ejecting head 2 in the liquid ejecting apparatus 1 is not limited to those illustrated below.

As illustrated in the drawing, the liquid ejecting head 2 includes the head chip 8, a flow path member 200 having a flow path 400, a relay substrate 210, and a cover head 220.

The flow path member 200 includes, as the flow path 400, a supply flow path that supplies the ink supplied from the liquid storage section 3 to the head chip 8, and a discharge flow path for returning the ink that is not ejected from the nozzle of the head chip 8 to the liquid storage section 3. FIG. 3 illustrates only the supply flow path as the flow path 400, and the flow path 400, which is the supply flow path, will be described below.

The flow path member 200 includes a first flow path member 201 provided with a first flow path 401, a second flow path member 202 provided with a second flow path 402, and a sealing member 203 that couples the first flow path 401 and the second flow path 402 in a liquid-tight state.

The first flow path member 201, the sealing member 203, and the second flow path member 202 are laminated in this order in the +Z direction.

In the present embodiment, the first flow path member 201 is configured by laminating three members 201*a*, 201*b*, and 201*c* in the Z-axis direction. The first flow path member 201 includes a supply-side flow path coupling section 204*a* coupled to the liquid storage section 3 in which the ink, which is the liquid, is stored. In the present embodiment, the supply-side flow path coupling section 204*a* protrudes in a tubular shape in the −Z direction on the surface in the −Z direction of the first flow path member 201. The supply tube 7*d* is coupled to the supply-side flow path coupling section 204*a*. Inside the supply-side flow path coupling section 204*a*, the first flow path 401 to which the ink from the liquid storage section 3 is supplied is provided.

The first flow path 401 includes a flow path extending in the Z-axis direction, a flow path extending along a lamination interface of laminated members, and the like. In the middle of the first flow path 401, a widened filter chamber

401*a* having an inner diameter wider than other regions is provided, and a filter 401*b* that captures foreign substances such as dust and air bubbles contained in the ink is provided inside the filter chamber 401*a*.

In the present embodiment, one first flow path member 201 includes four supply-side flow path coupling sections 204*a* and four independent first flow paths 401. The first flow path 401 may be branched into two or more downstream of the filter 401*b*, for example.

In addition, as illustrated in FIG. 2, the first flow path member 201 includes four discharge-side flow path coupling sections 204*b*. The recovery tube 7*c* is coupled to each discharge-side flow path coupling section 204*b*, and the ink that is not ejected from the nozzle 21 of the liquid ejecting head 2 is returned to the sub tank 3*b* through the recovery tube 7*c*. A discharge flow path is provided inside the discharge-side flow path coupling section 204*b* (not illustrated). That is, the flow path member 200 is provided with four discharge flow paths (not illustrated). Incidentally, it is not necessary to provide a filter in the middle of the discharge flow path. Hereinafter, when the supply-side flow path coupling section 204*a* and the discharge-side flow path coupling section 204*b* are not distinguished, the sections are referred to as a flow path coupling section 204.

The second flow path member 202 includes the second flow path 402 communicating with each of the first flow paths 401. That is, the second flow path member 202 includes four second flow paths 402. The first flow path 401 and the second flow path 402 are coupled in a liquid-tight state through the sealing member 203. As a material of the sealing member 203, a material which has liquid resistance to liquids such as ink used in the liquid ejecting head 2 and is elastically deformable, for example, a rubber, elastomer or the like may be used. The sealing member 203 is provided with a coupling flow path 403 penetrating in the Z-axis direction, and the first flow path 401 and the second flow path 402 communicate with each other through the coupling flow path 403. That is, the flow path 400, which is a supply flow path of the flow path member 200, includes the first flow path 401, the second flow path 402, and the coupling flow path 403.

The head chip 8 is held on the surface of the second flow path member 202 facing the +Z direction. The liquid ejecting head 2 of the present embodiment holds a plurality of, in the present embodiment, two head chips 8 as an example. It is needless to say that the number of head chips 8 held by the liquid ejecting head 2 is not particularly limited thereto, and may be one or two or more. Further, in the present embodiment, the two head chips 8 are arranged side by side in the Y-axis direction to be at the same position in the X-axis direction. It is needless to say that the disposition of the plurality of head chips 8 is not particularly limited thereto, and may be disposed in a staggered pattern along the X-axis direction, for example.

The second flow path 402 communicates with each inlet 44*a* of the head chip 8. Further, a discharge flow path (not illustrated) of the flow path member 200 is coupled to the outlet 44*b* of the head chip 8.

In addition, the second flow path member 202 is provided with a wiring holding hole 205 through which a wiring member 110 of each head chip 8 is inserted. In the present embodiment, two wiring holding holes 205 are provided for each of two head chips 8. The wiring member 110 (to be described in detail later) of the head chip 8 is derived to the surface side of the second flow path member 202 facing the −Z direction through the wiring holding hole 205.

In the Z-axis direction, the relay substrate 210 to which the wiring members 110 of the plurality of head chips 8 are commonly coupled is provided between the sealing member 203 and the first flow path member 201. The relay substrate 210 is formed of a hard rigid substrate with no flexibility, and on which wiring, electronic components, and the like (not illustrated) are mounted. In the present embodiment, a connector 211 to which an external wiring is coupled as an electronic component is illustrated. Then, a print signal and the like for controlling the head chip 8 is input from the external wiring to the relay substrate 210 through the connector 211, and is supplied from the relay substrate 210 to each head chip 8. An external wiring opening portion 206 for inserting an external wiring coupled to the connector 211 is provided on the side wall of the flow path member 200 facing the connector 211. The external wiring is coupled to the connector 211 of the relay substrate 210 provided inside the flow path member 200 through the external wiring opening portion 206.

The relay substrate 210 is provided with a wiring insertion hole 212 for deriving the wiring member 110 of the head chip 8 to the surface side facing the −Z direction. A total of two wiring insertion holes 212 are provided, one for each head chip 8.

In addition, the relay substrate 210 is provided with a projection portion insertion hole 213 provided to penetrate the relay substrate 210 in the Z-axis direction. A projection portion 207 provided with the second flow path 402 on the inside thereof is provided on a surface of the second flow path member 202 facing the −Z direction to protrude in the −Z direction, and the projection portion 207 is inserted on the −Z direction side of the relay substrate 210 through the projection portion insertion hole 213, and coupled to the coupling flow path 403.

The cover head 220 is fixed to the surface of the flow path member 200 facing the +Z direction. In the present embodiment, the cover head 220 has a size that covers two head chips 8. The cover head 220 is provided with an exposure opening portion 221 that exposes the nozzle 21 of the head chip 8 in the +Z direction independently for each head chip 8. Ink is ejected from the nozzle 21 exposed from the exposure opening portion 221 in the +Z direction. It is needless to say that the exposure opening portion 221 may be provided in common to the plurality of head chips 8.

Figure 5:
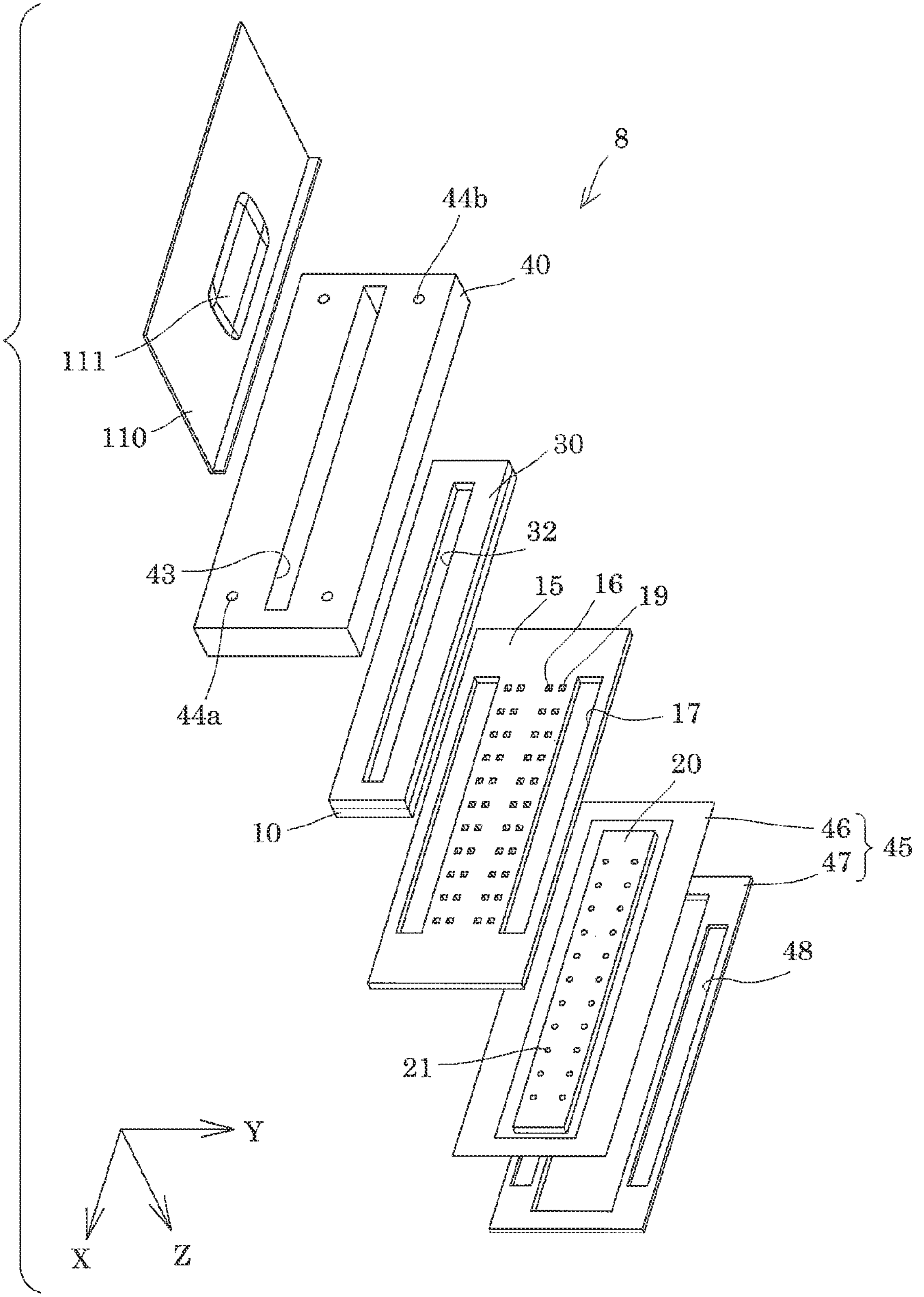
FIG. 5 is an exploded perspective view of a head chip according to Embodiment 1.
Figure 6:
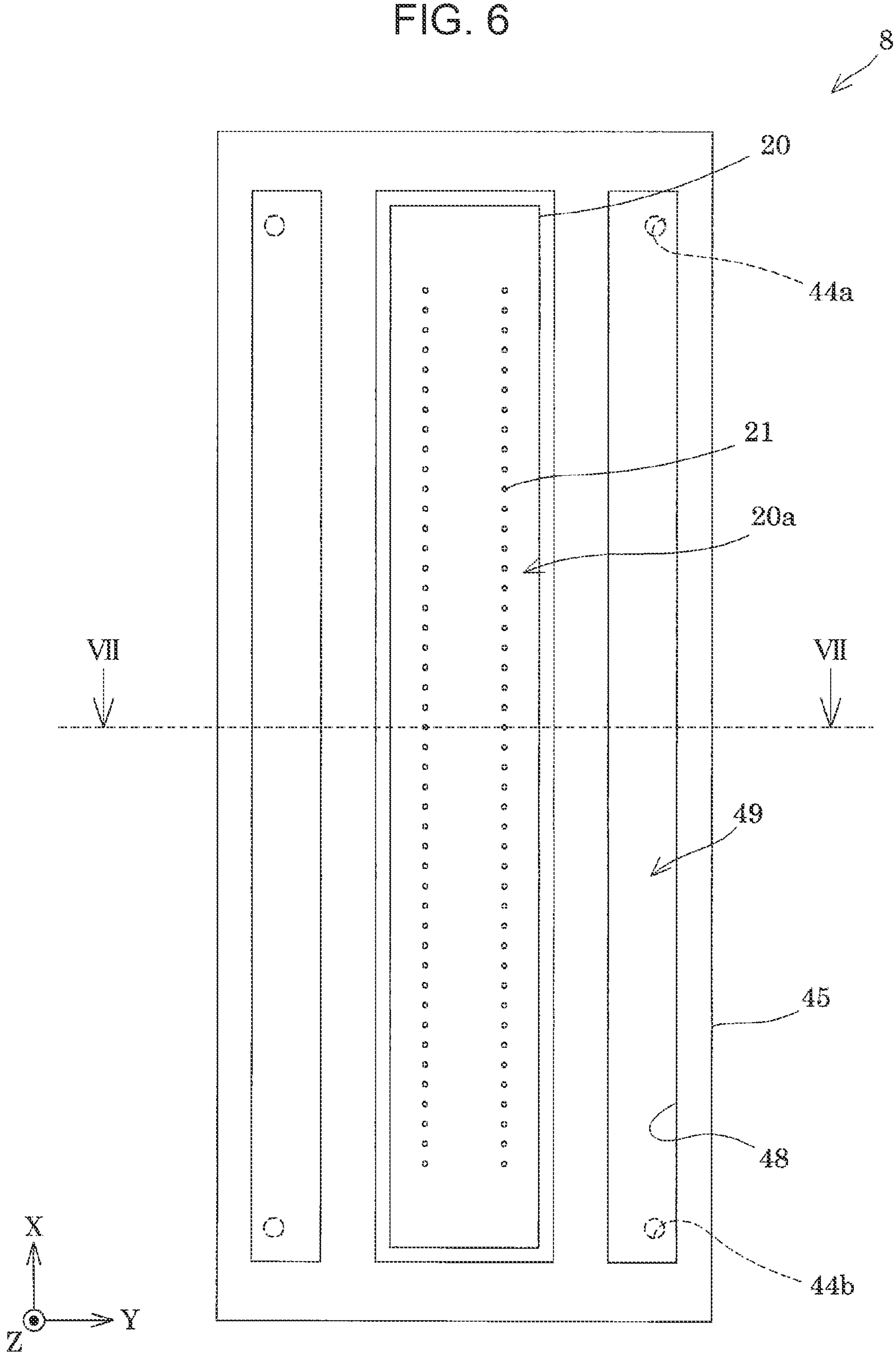
FIG. 6 is a plan view of the head chip according to Embodiment 1.

Here, the head chip 8 mounted on the liquid ejecting head 2 will be further described with reference to FIGS. 5 to 7. FIG. 5 is an exploded perspective view of the head chip 8 according to the embodiment of the present disclosure. FIG. 6 is a plan view of the head chip 8. FIG. 7 is a cross-sectional view of the head chip 8 and the cover head 220 according to the line VII-VII in FIG. 6. Each direction of the head chip 8 will be described based on the directions when mounted on the liquid ejecting head 2, that is, the X-axis direction, the Y-axis direction, and the Z-axis direction.

As illustrated in the drawing, the head chip 8 of the present embodiment includes a flow path forming substrate 10. The flow path forming substrate 10 is made of, for example, a silicon substrate, a glass substrate, an SOI substrate, various ceramic substrates, or the like.

On the flow path forming substrate 10, a plurality of pressure chambers 12 are disposed side by side along the X-axis direction. The plurality of pressure chambers 12 are disposed on a straight line along the X-axis direction such that the positions in the Y-axis direction are the same. The pressure chambers 12 adjacent to each other in the X-axis direction are partitioned by a partition wall. In addition, in the present embodiment, two pressure chamber rows in which the pressure chambers 12 are arranged side by side in the X-axis direction are provided in the Y-axis direction. It is needless to say that the disposition of the pressure chambers 12 is not particularly limited thereto, and the plurality of pressure chambers 12 may be disposed in a staggered pattern along the X-axis direction, for example.

A communication plate 15 and a nozzle plate 20 are sequentially laminated on the surface of the flow path forming substrate 10 facing the +Z direction.

The communication plate 15 is a plate-shaped member joined to a surface of the flow path forming substrate 10 facing the +Z direction. The communication plate 15 is provided with a nozzle communication passage 16 that causes the pressure chamber 12 and the nozzle 21 to communicate with each other.

The communication plate 15 is provided with a first manifold portion 17 and a second manifold portion 18 that configure a part of a manifold 100 serving as a common liquid chamber with which the plurality of pressure chambers 12 commonly communicate. The first manifold portion 17 is provided to penetrate the communication plate 15 in the Z-axis direction. Further, the second manifold portion 18 is provided to open on the surface facing the +Z direction without penetrating the communication plate 15 in the Z-axis direction.

The communication plate 15 is provided with a supply communication passage 19 that communicates with one end portion of the pressure chamber 12 in the Y-axis direction, independently for each pressure chamber 12. The supply communication passage 19 causes the second manifold portion 18 and the pressure chambers 12 to communicate with each other, and supplies the ink in the manifold 100 to the pressure chamber 12.

As the communication plate 15, a silicon substrate, a glass substrate, an SOI substrate, various ceramic substrates, a metal substrate such as a stainless steel substrate, or the like can be used. It is preferable that the communication plate 15 uses a material substantially the same as the coefficient of thermal expansion of the flow path forming substrate 10. By using a material having substantially the same coefficient of thermal expansion for the flow path forming substrate 10 and the communication plate 15 in this manner, it is possible to reduce the occurrence of warpage due to heat caused by the difference in the coefficient of thermal expansion.

The nozzle plate 20 is joined to the side of the communication plate 15 opposite to the flow path forming substrate 10, that is, on the surface facing the +Z direction.

The nozzle plate 20 is formed with the nozzle 21 that communicates with each of the pressure chambers 12 through the nozzle communication passage 16. The nozzle 21 includes a first part 21*a* provided on the +Z direction side which is an ejection surface 20*a* side, and a second part 21*b* provided on the pressure chamber 12 side, that is, on the −Z direction side of the first part 21*a*. The first part 21*a* has a smaller opening area than the second part 21*b*. That is, the cross-sectional area of the first part 21*a* along the XY plane defined by the X-axis and the Y-axis is smaller than the cross-sectional area of the second part 21*b* along the XY plane. When the opening shape of the nozzle 21 is circular, the diameter of the first part 21*a* is smaller than the diameter of the second part 21*b*.

In addition, in the present embodiment, the plurality of nozzles 21 are disposed side by side to be arranged in a row in the X-axis direction. In addition, in the present embodiment, two nozzle arrays in which the nozzles 21 are arranged side by side in the X-axis direction are provided with a gap in the Y-axis direction. In the two nozzle arrays arranged side by side in the Y-axis direction, the nozzles 21 that form each array may be disposed in a state of deviating from each other by half a pitch in the X-axis direction. As the nozzle plate 20, a silicon substrate, a glass substrate, an SOI substrate, various ceramic substrates, a metal substrate such as a stainless steel substrate, an organic substance such as a polyimide resin, or the like can be used. It is preferable to use a material for the nozzle plate 20 that is substantially the same as the coefficient of thermal expansion of the communication plate 15. By using a material having substantially the same coefficient of thermal expansion for the nozzle plate 20 and the communication plate 15 in this manner, it is possible to reduce the occurrence of warpage due to heat caused by the difference in the coefficient of thermal expansion.

A vibration plate 50 and a piezoelectric element 300 are sequentially laminated on the surface of the flow path forming substrate 10 facing the −Z direction.

In the present embodiment, the vibration plate 50 includes an elastic film 51, which is made of silicon oxide, provided on the flow path forming substrate 10 side, and an insulating film 52, which is made of a zirconium oxide, provided on the surface of the elastic film 51 facing the −Z direction. The vibration plate 50 may include only the elastic film 51 or only the insulating film 52, and may be configured to have other films in addition to the elastic film 51 and the insulating film 52.

The piezoelectric element 300 includes a first electrode 60, a piezoelectric body layer 70, and a second electrode 80 that are sequentially laminated on the vibration plate 50 in the −Z direction. The piezoelectric element 300 is a drive element that causes a pressure change in the ink in the pressure chamber 12. The piezoelectric element 300 is also referred to as a piezoelectric actuator, and refers to a part including the first electrode 60, the piezoelectric body layer 70, and the second electrode 80. In addition, a part where piezoelectric strain occurs in the piezoelectric body layer 70 when a voltage is applied between the first electrode 60 and the second electrode 80 is referred to as an active portion 310. On the other hand, a part where piezoelectric strain does not occur in the piezoelectric body layer 70 is referred to as an inactive portion. That is, the active portion 310 refers to a part where the piezoelectric body layer 70 is interposed between the first electrode 60 and the second electrode 80. In the present embodiment, the active portion 310 is formed for each pressure chamber 12. That is, the plurality of active portions 310 are formed in the piezoelectric element 300. In general, any one of the electrodes of the active portion 310 is configured as an independent individual electrode for each active portion 310, and the other electrode is configured as a common electrode common to the plurality of active portions 310. In the present embodiment, the first electrode 60 is configured as an individual electrode, and the second electrode 80 is configured as a common electrode. It is needless to say that the first electrode 60 may form a common electrode, and the second electrode 80 may form an individual electrode.

Here, the first electrode 60 forms an individual electrode that is separated for each pressure chamber 12 and is independent for each active portion 310. The first electrode 60 is formed to have a width narrower than the width of the pressure chamber 12 in the +X direction. That is, the end portion of the first electrode 60 is positioned inside the region facing the pressure chamber 12 in the +X direction. In addition, as illustrated in FIG. 7, the end portion on the nozzle 21 side is disposed outside the pressure chamber 12 in the Y-axis direction of the first electrode 60. A lead electrode 90, which is a lead-out wiring, is coupled to the end portion of the first electrode 60 disposed outside the pressure chamber 12 in the Y-axis direction.

The piezoelectric body layer 70 is continuously provided across the X-direction to have a predetermined width in the +Y direction. A width of the piezoelectric body layer 70 in the Y-axis direction is wider than the length of the pressure chamber 12 in the Y-axis direction. Therefore, the piezoelectric body layer 70 extends to the outside of the region facing the pressure chamber 12 on both sides of the pressure chamber 12 in the +Y direction and the −Y direction. The end portion of the piezoelectric body layer 70 on the side opposite to the nozzle 21 in the Y-axis direction is positioned outside the end portion of the first electrode 60. That is, the end portion of the first electrode 60 on the side opposite to the nozzle 21 is covered with the piezoelectric body layer 70. In addition, the end portion of the piezoelectric body layer 70 on the nozzle 21 side is positioned inside the end portion of the first electrode 60, and the end portion of the first electrode 60 on the nozzle 21 side is not covered with the piezoelectric body layer 70.

The piezoelectric body layer 70 is configured by using a piezoelectric material made of a perovskite structure composite oxide represented by the general formula $ABO_3$.

As illustrated in FIG. 7, the second electrode 80 is continuously provided on the −Z direction side, which is the side opposite to the first electrode 60 of the piezoelectric body layer 70, and forms a common electrode common to the plurality of active portions 310. The second electrode 80 is continuously provided in the X-axis direction such that the Y-axis direction has a predetermined width. In addition, the second electrode 80 is also provided on the inner surface of the recess portion, that is, the side surface of the recess portion of the piezoelectric body layer 70, and on the vibration plate 50 which is the bottom surface of the recess portion. It is needless to say that the second electrode 80 may be provided only on a part of the inner surface of the recess portion, or may not be provided over the entire inner surface of the recess portion.

In addition, the lead electrode 90, which is a lead-out wiring, is led out from the first electrode 60. The wiring member 110 formed of a flexible substrate is coupled to the end portion of the lead electrode 90 on the side opposite to the end portion coupled to the piezoelectric element 300. The wiring member 110 is mounted with a drive signal selection circuit 111 having a plurality of switching elements for selecting whether or not to drive each of the active portions 310. That is, the wiring member 110 is made of COF. The wiring member 110 may not be provided with the drive signal selection circuit 111. That is, the wiring member 110 may be FFC, FPC or the like.

Each layer of the piezoelectric element 300 including the first electrode 60, the piezoelectric body layer 70, and the second electrode 80 is formed by a film formation and lithography method. Therefore, the piezoelectric element 300 according to the present embodiment is a piezoelectric thin film including the piezoelectric body layer 70 which is a "thin film piezoelectric body". Here, the piezoelectric thin film including the thin film piezoelectric body refers to a film having a thickness of less than 10 μm in the Z-axis direction, which is the lamination direction, including the first electrode 60, the piezoelectric body layer 70, and the second electrode 80. The piezoelectric thin film preferably has a thickness equal to or less than 3 μm in order to dispose the plurality of nozzles 21 at a high density.

Further, a protective substrate 30 having substantially the same size as that of the flow path forming substrate 10 is joined to the surface of the flow path forming substrate 10 facing the −Z direction. The protective substrate 30 has a holding section 31 which is a space for protecting the piezoelectric element 300. The holding sections 31 are provided independently for each row of the piezoelectric elements 300 disposed side by side in the X-axis direction, and two holding sections 31 are formed to be arranged in the Y-axis direction. The protective substrate 30 is provided with a through-hole 32 penetrating in the Z-axis direction between the two holding sections 31 disposed side by side in the Y-axis direction. The end portion of the lead electrode 90 led out from the electrode of the piezoelectric element 300 is extended to be exposed in the through-hole 32, and the lead electrode 90 and the wiring member 110 are electrically coupled to each other in the through-hole 32.

Examples of the protective substrate 30 include a silicon substrate, a glass substrate, an SOI substrate, and various ceramic substrates, similarly to the flow path forming substrate 10. The protective substrate 30 preferably uses a material having substantially the same coefficient of thermal expansion as that of the flow path forming substrate 10. By using a material having substantially the same coefficient of thermal expansion for the flow path forming substrate 10 and the protective substrate 30 in this manner, it is possible to reduce the occurrence of warpage due to heat caused by the difference in the coefficient of thermal expansion.

Further, on the protective substrate 30, a case member 40 for defining the manifold 100 communicating with the plurality of pressure chambers 12 together with the flow path forming substrate 10 is fixed. The case member 40 has substantially the same shape as the communication plate 15 described above in plan view, and is joined to the protective substrate 30 and also joined to the communication plate 15 described above.

The case member 40 has a recess portion 41 having a depth for accommodating the flow path forming substrate 10 and the protective substrate 30 on the protective substrate 30 side. The recess portion 41 has a wider opening area than that of the surface on which the protective substrate 30 is joined to the flow path forming substrate 10. The opening surface of the recess portion 41 on the nozzle plate 20 side is sealed by the communication plate 15 in a state where the flow path forming substrate 10 and the protective substrate 30 are accommodated in the recess portion 41.

The case member 40 is provided with a third manifold portion 42 communicating with the first manifold portion 17 of the communication plate 15. The first manifold portion 17 and the second manifold portion 18 provided in the communication plate 15 and the third manifold portion 42 provided in the case member 40 form the manifold 100 of the present embodiment. A total of two manifolds 100 are provided, one for each row of the pressure chambers 12. Each manifold 100 is continuously provided in the X-axis direction in which the pressure chambers 12 are disposed side by side, and the supply communication passages 19 that communicate with each of the pressure chambers 12 and the manifold 100 are disposed side by side in the X-axis direction. The case member 40 is provided with the inlet **44*a* that communicates with the manifolds 100 to supply ink to each of the manifolds 100. In addition, the case member 40 is provided with a coupling port 43 through which the wiring member 110 is inserted to communicate with the through-hole 32 of the protective substrate 30, and the wiring member 110 is derived to the surface side of the liquid ejecting head 2 facing the −Z direction through the coupling port 43. As the case member 40**, a metal material, a resin material, or the like can be used.

A compliance substrate 45 is provided on the surface of the communication plate 15 on the +Z direction side where the first manifold portion 17 and the second manifold portion 18 are open. The compliance substrate 45 seals the openings of the first manifold portion 17 and the second manifold portion 18 on the ejection surface 20*a* side. The compliance substrate 45 includes a sealing film 46 made of a flexible thin film and a fixed substrate 47 made of a hard material such as metal in the present embodiment. Since a region of the fixed substrate 47 facing the manifold 100 is an opening portion 48 that is completely removed in the thickness direction, one surface of the manifold 100 is a compliance portion 49 which is a flexible portion sealed only by the flexible sealing film 46.

The cover head 220 is joined to the surface of the compliance substrate 45 facing the +Z direction. That is, the cover head 220 is joined to the fixed substrate 47 to cover the opening portion 48. The space between the cover head 220 and the sealing film 46 can be deformed according to the pressure of the ink in the manifold 100 by opening the compliance portion 49 of the sealing film 46 to the atmosphere.

Further, a filler 22 is filled between the nozzle plate 20 and the compliance substrate 45 and the exposure opening portion 221 of the cover head 220. As the filler 22, an adhesive, a potting agent, a molding agent, or the like can be used. By filling the gap between the nozzle plate 20 and the cover head 220 with the filler 22 in this manner, it is possible to suppress the ink from staying in the gap when the ejection surface 20*a* is wiped by the blade. In addition, it is possible to suppress the blade, which is wiped by the filler 22, from abutting against the corner portion of the nozzle plate 20 and scraping the blade, and it is possible to suppress a decrease in the life of the blade.

Figure 8:
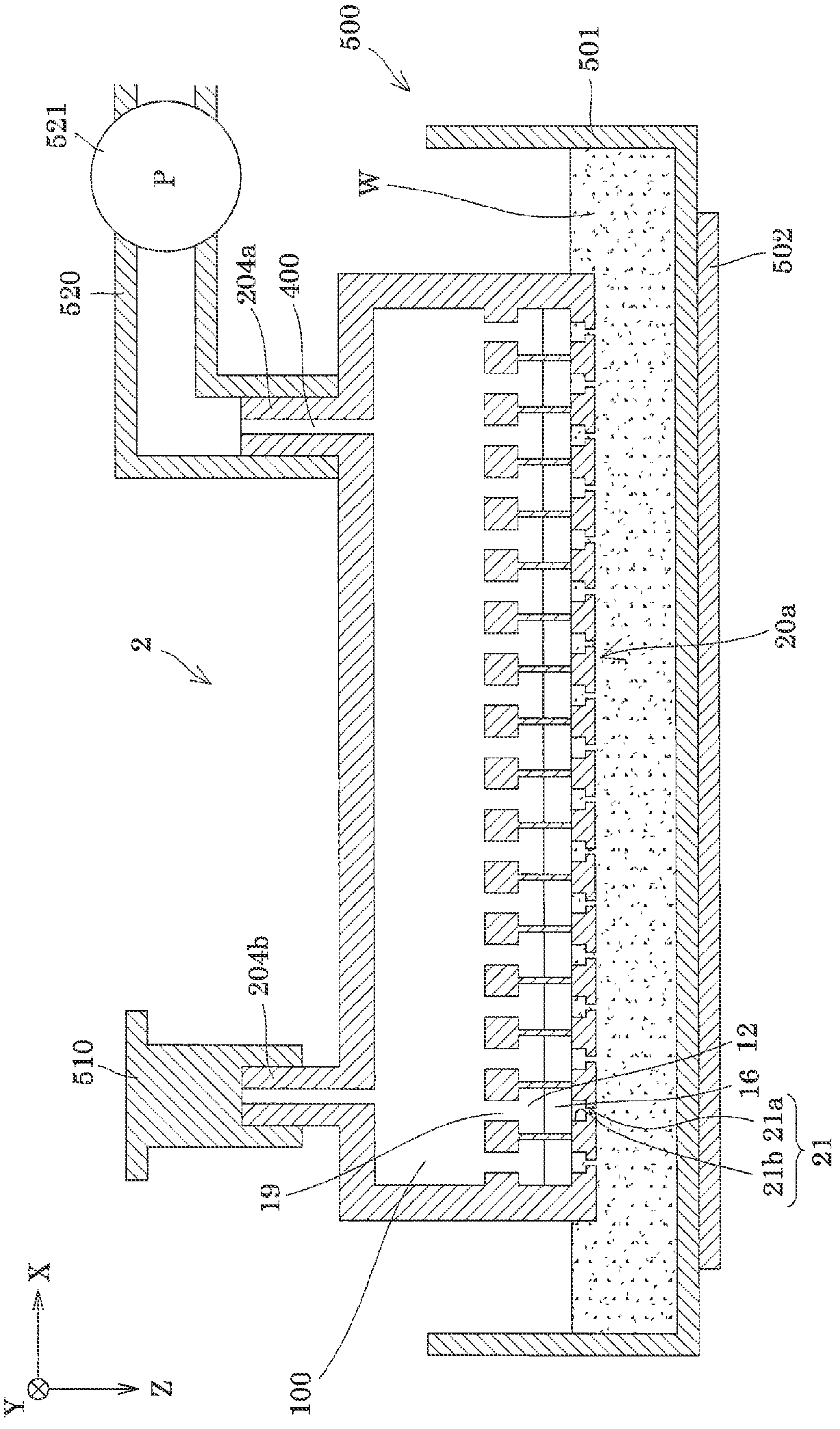
FIG. 8 is a schematic view illustrating an ultrasonic cleaning step according to Embodiment 1.
Figure 9:
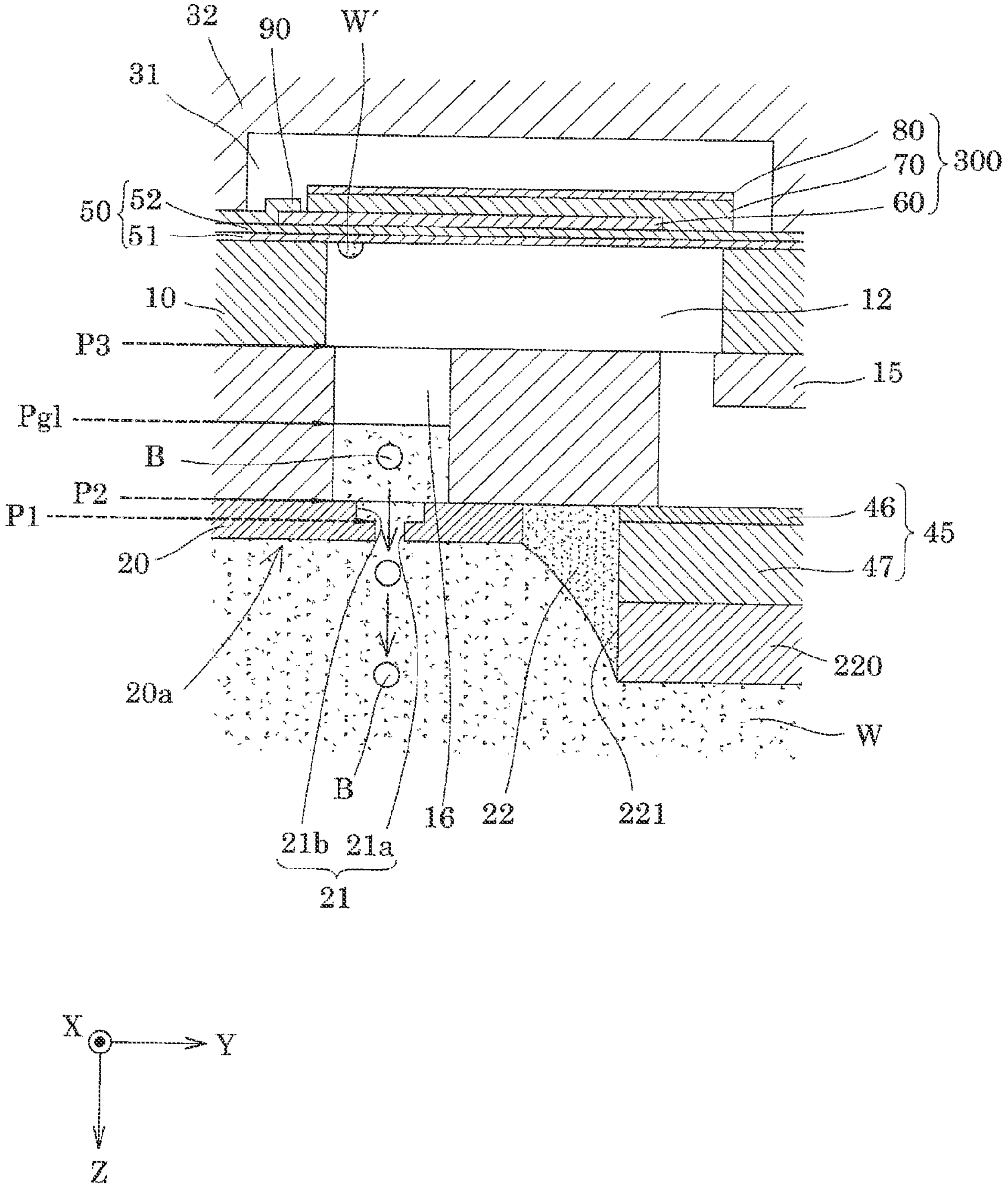
FIG. 9 is a cross-sectional view of a main portion describing the ultrasonic cleaning step according to Embodiment 1.

Hereinafter, a method for cleaning the liquid ejecting head 2 will be described with reference to FIGS. 8 and 9. FIG. 8 is a schematic view describing the ultrasonic cleaning step of the liquid ejecting head 2. FIG. 9 is a sectional view of a main portion of the liquid ejecting head 2 and the cover head 220 for describing the ultrasonic cleaning step.

As illustrated in FIG. 8, an ultrasonic cleaning apparatus 500 that cleans the liquid ejecting head includes a cleaning tank 501 and an ultrasonic vibrator 502 attached to the cleaning tank 501.

The cleaning tank 501 is a container capable of accommodating a cleaning liquid W therein. As the cleaning liquid W accommodated in the cleaning tank 501, for example, a solvent of ink, that is, a liquid containing no coloring material, a water-soluble solvent such as pure water and a water-soluble alcohol, and potassium hydroxide can be used, and a surfactant or an antifoaming agent may be added as necessary.

Further, the surface of the cleaning tank 501 facing the −Z direction is open larger than that of the liquid ejecting head 2, and the liquid ejecting head 2 is inserted into the cleaning tank 501 from the surface side of the cleaning tank 501 facing the −Z direction.

The ultrasonic vibrator 502 is fixed to the outer peripheral surface of the cleaning tank 501. The ultrasonic vibrator 502 gives ultrasonic vibration to the cleaning liquid W accommodated in the cleaning tank 501. The ultrasonic vibrator 502 gives, for example, ultrasonic vibration, which is any frequency from 20 kHz to 200 kHz, to the cleaning liquid W.

Using the ultrasonic cleaning apparatus 500, the ultrasonic cleaning step of cleaning the nozzle 21 of the liquid ejecting head 2 removed from the liquid ejecting apparatus 1 with the cleaning liquid W obtained by the ultrasonic vibration is performed.

In the ultrasonic cleaning step, the cleaning liquid W in the cleaning tank 501 is ultrasonically vibrated in a state where the nozzle 21 of the liquid ejecting head 2 is immersed in the cleaning liquid W of the cleaning tank 501 and the gas is present in the pressure chamber 12.

Here, in the ultrasonic cleaning step, "a state where the nozzle 21 is immersed in the cleaning liquid" means a state where the opening of the nozzle 21 on the ejection surface 20*a* side, that is, one end of the nozzle 21 in the +Z direction is immersed in the cleaning liquid W. That is, when one end of the nozzle 21 in the +Z direction is immersed in the cleaning liquid W, the entirety of the nozzle 21 in the Z-axis direction may not be immersed in the cleaning liquid W. In other words, in a state where only the ejection surface 20*a* of the nozzle plate 20 is immersed in the cleaning liquid W, the entire thickness of the nozzle plate 20 in the Z-axis direction may not be immersed in the cleaning liquid W. The foreign substances may start to adhere to the nozzle 21 from one end on the ejection surface 20*a* side of the nozzle 21, and may finally adhere to the entire nozzle 21 to block the nozzle 21. Since the ultrasonic cleaning step is performed to clean the foreign substances adhering to the nozzle 21 with the cleaning liquid W, at least one end of the nozzle 21 in the +Z direction may be immersed in the cleaning liquid W. Examples of the foreign substances adhering to the nozzle 21 include a material in which the ultraviolet curable ink is solidified by ultraviolet rays, and a mixture of the pigment ink and a reaction liquid for aggregating the pigment included in the pigment ink. It is difficult to remove such foreign substances even when a cleaning unit mounted on a normal liquid ejecting apparatus, such as cleaning with a wiper blade that wipes the ejection surface 20*a*, or covering the ejection surface 20*a* with a cap, and cleaning for sucking ink and foreign substances from the nozzle 21 by sucking the inside of the cap, and the like are performed. It is needless to say that the type of ink and the type of foreign substances are not limited to those described above.

It is needless to say that, as long as the state where the gas is present in the pressure chamber 12 (to be described later) can be maintained, the entire nozzle plate 20, a part or the entirety of the head chip 8, and a part of the flow path member 200 may be immersed in the cleaning liquid W.

The liquid surface of the cleaning liquid W entering the nozzle 21, that is, a position Pg1 of the gas-liquid interface between the cleaning liquid W and the gas may be inside the nozzle 21, inside the nozzle communication passage 16, inside the pressure chamber 12, or the like. Incidentally, when the liquid surface of the cleaning liquid W is in the pressure chamber 12, it is necessary to be at a position where the cleaning liquid W does not adhere to the vibration plate 50, as will be described later. Further, since the cleaning liquid W is likely to form a meniscus at a stepped part in which the opening area changes due to the surface tension, the gas-liquid interface, which is the liquid surface of the cleaning liquid W, is likely to be formed, for example, at a boundary P1 between the first part 21*a* and the second part 21*b* of the nozzle 21, a boundary P2 between the second part 21*b* and the nozzle communication passage 16, a boundary P3 between the nozzle communication passage 16 and the pressure chamber 12, and the like. The position Pg1 of the gas-liquid interface is preferably positioned upstream of the nozzle 21, that is, between the nozzle 21 and the vibration plate 50. In addition, for example, it is preferable to be positioned at the boundary P2 between the second part 21*b* of the nozzle 21 and the nozzle communication passage 16, the boundary P3 between the nozzle communication passage 16 and the pressure chamber 12, and the like. Therefore, the entire nozzle 21 can be filled with the cleaning liquid W, and foreign substances adhering to the nozzle 21 can be removed in the ultrasonic vibration step.

Further, the state where the gas is present in the pressure chamber 12 in the ultrasonic cleaning step is performed by introducing the gas into the flow path 400 of the liquid ejecting head 2 in the present embodiment. That is, one opening of the supply-side flow path coupling section 204*a* and the discharge-side flow path coupling section 204*b* of the liquid ejecting head 2 is blocked, and the gas is supplied to the flow path 400 of the liquid ejecting head 2 through the other one. In the present embodiment, the opening of the discharge-side flow path coupling section 204*b* is blocked by a blocking member 510, and a pressure-feeding unit including a pump 521 for sending gas toward the liquid ejecting head 2 through the gas supply tube 520 is coupled to the supply-side flow path coupling section 204*a*. The pump 521 introduces the gas into the flow path of the liquid ejecting head 2 by pressure-feeding the gas from the gas supply tube 520. As a result, the gas is introduced from the flow path 400 into the manifold 100 and the pressure chamber 12 through the inlet of the head chip 8, and the gas is present in the pressure chamber 12.

As illustrated in FIG. 9, the state where the gas is present in the pressure chamber 12 means a state where a cleaning liquid W', which is a part of the cleaning liquid W, adheres to the vibration plate 50, but the cleaning liquid W of the cleaning tank 501 and the cleaning liquid W' adhering to the vibration plate 50 are intermittently coupled to each other, that is, a state where a gas is present between the cleaning liquid W of the cleaning tank 501 and the cleaning liquid W' adhering to the vibration plate 50. Further, the state where the gas is present in the pressure chamber 12 includes a state where the cleaning liquid W', which is a part of the cleaning liquid W, does not adhere to the vibration plate 50 in FIG. 9, that is, a state where the entire surface of the vibration plate 50 is in contact with the gas.

In the present embodiment, as illustrated in FIG. 9, while the ultrasonic vibrator 502 is ultrasonically vibrating in the ultrasonic cleaning step, gas is introduced through the supply-side flow path coupling section 204*a* of the liquid ejecting head 2 such that the air bubbles B are discharged from the nozzle 21. That is, while the ultrasonic vibrator 502 is giving the ultrasonic vibration to the cleaning liquid W, the pump 521 continues to introduce the gas toward the liquid ejecting head 2, and thus the air bubbles B are discharged from the nozzle 21. The amount of air bubbles B discharged from the nozzle 21 is determined by a difference pressure between a supply pressure of gas by the pump 521 and a water pressure applied to the nozzle 21 when the liquid ejecting head 2 is submerged in the cleaning liquid W of the cleaning tank 501.

By discharging the air bubbles B from the nozzle 21 in the ultrasonic cleaning step as described above, it is possible to easily maintain the state where the pressure chamber 12 is not filled with the cleaning liquid W and the gas is present. That is, there is no need for advanced pressure adjustment by the pump 521 to adjust the position Pg1 of the gas-liquid interface inside the liquid ejecting head 2.

As the gas introduced into the flow path 400 of the liquid ejecting head 2, for example, an inert gas such as air or nitrogen may be used. Although a pump is exemplified as the pressure-feeding unit that pressure-feeds the gas to the liquid ejecting head 2, the pressure-feeding unit is not particularly limited thereto, and for example, a tank that stores the compressed gas may be coupled to the flow path coupling section 204, and the gas compressed from the tank may be introduced into the liquid ejecting head 2.

As described above, in the ultrasonic vibration step, the cleaning liquid W in the cleaning tank 501 is ultrasonically vibrated by the ultrasonic vibrator 502 in a state where the nozzle 21 is immersed in the cleaning liquid W and the gas is present in the pressure chamber 12. As a result, foreign substances adhering to the nozzle 21 can be washed away by the cleaning liquid W that vibrates ultrasonically, transmission of ultrasonic vibration during cleaning to the vibration plate 50 through the cleaning liquid W can be suppressed, and damage to the vibration plate 50 and the piezoelectric element 300 due to ultrasonic vibration can be suppressed. Incidentally, when the cleaning liquid W in the cleaning tank 501 continuously fills up to the pressure chamber 12, the foreign substances adhering to the nozzle 21 can be washed away, but the ultrasonic vibration is transmitted to the vibration plate 50 through the cleaning liquid W, and there is a concern that the vibration plate 50 and the piezoelectric element 300 is damaged due to ultrasonic vibration. Specifically, there is a concern that cavitation occurs in the cleaning liquid W in the pressure chamber 12, and thus there is a concern that the vibration plate 50 and the piezoelectric element 300 are damaged.

Further, in order to cause the gas to be present in the pressure chamber 12 in the ultrasonic cleaning step, the air bubbles B are discharged from the nozzle 21, and accordingly, the meniscus of the cleaning liquid W formed in the nozzle 21 can be vibrated, and further vibration can be given to the foreign substances adhering to the nozzle 21. Therefore, the foreign substances adhering to the nozzle 21 can be easily washed away by the vibration of the meniscus of the cleaning liquid W caused by the air bubbles B. Further, since the air bubbles B discharged from the nozzle 21 are present around the ejection surface 20*a* of the liquid ejecting head 2, the standing wave transmitted through the cleaning liquid W by the ultrasonic vibration can be attenuated, and the standing wave can be made difficult to be transmitted to the nozzle plate 20. Accordingly, it is possible to suppress the application of large vibration to the flow path forming substrate 10, the piezoelectric element 300, and the like due to the standing wave transmitted to the nozzle plate 20, and to suppress damage to the vibration plate 50 and the piezoelectric element 300 due to vibration.

In the ultrasonic cleaning step, even when it is detected whether or not the gas is present in the pressure chamber 12, and when the gas is present in the pressure chamber 12, the ultrasonic vibration of the ultrasonic vibrator 502 may be started. That is, when the gas is not present in the pressure chamber 12, that is, when a liquid such as the cleaning liquid W or the ink other than the gas is present in the pressure chamber 12, the ultrasonic vibration of the ultrasonic vibrator 502 is not performed. Thereby, it is possible to suppress transmission of ultrasonic vibration to the vibration plate 50 and the piezoelectric element 300 through the liquid in the pressure chamber 12, and to suppress damage to the vibration plate 50 and the piezoelectric element 300 due to the ultrasonic vibration. In addition, when it is detected that the gas is not present in the pressure chamber 12, for example, the liquid ejecting head 2 may be taken out from the cleaning tank 501, and a replacing step of replacing the liquid such as the cleaning liquid W or the ink in the liquid ejecting head 2 with the gas may be performed. In addition, when it is detected that the gas is not present in the pressure chamber 12, for example, the pressure of the gas supplied into the liquid ejecting head 2 may be increased by the pump 521, and the cleaning liquid W or the ink in the pressure chamber 12 may be discharged from the nozzle 21. By using these correspondences alone or in combination, by performing the ultrasonic cleaning step in a state where a gas is introduced into the pressure chamber 12 and the gas is present in the pressure chamber 12, damage to the vibration plate 50 and the piezoelectric element 300 due to ultrasonic vibration can be suppressed.

For example, the piezoelectric element 300 is driven, and then the excessive voltage (also known as electromotive voltage) generated in the piezoelectric element 300 is detected. The detection of whether or not the gas is present in the pressure chamber 12 can be performed based on the state of the vibration, so-called residual vibration, for example, the period and amplitude of the residual vibration. This is because, after the piezoelectric element 300 is driven, the excessive voltage (also known as the electromotive voltage) generated in the piezoelectric element 300 differs in the state of the vibration, so-called residual vibration, for example, the period and amplitude of the residual vibration in the piezoelectric element 300 corresponding to the pressure chamber 12 that is not filled with ink and the piezoelectric element 300 corresponding to the pressure chamber 12 filled with ink. The state of the residual vibration of the electromotive voltage generated in the piezoelectric element 300 corresponding to the pressure chamber 12 which is not filled with ink and in which gas is present, for example, the period and amplitude of the residual vibration can be ascertained in advance, and the state of the residual vibration can be detected based on the presence of gas in the pressure chamber 12. In a case of detecting the electromotive voltage generated in the piezoelectric element 300, a drive pulse at the time of printing may be used, or a drive pulse for detection may be used. Incidentally, by driving one of the piezoelectric elements 300 once, for example, by the drive pulse that gives vibration to the ink in the pressure chamber 12 as the drive pulse for detection, and by detecting the subsequent vibration in the pressure chamber 12, that is, the electromotive voltage generated in the piezoelectric element 300, the vibration can be accurately read.

In this manner, only when the gas is present in the pressure chamber 12, by ultrasonically vibrating the ultrasonic vibrator to clean the pressure chamber 12, ultrasonic vibration of the vibration plate 50 and the piezoelectric element 300 through the cleaning liquid W or the ink can be suppressed, and damage to the vibration plate 50 and the piezoelectric element 300 due to ultrasonic vibration can be further suppressed.

In the present embodiment, the opening of the discharge-side flow path coupling section 204*b* is blocked by the blocking member 510, and the gas is supplied into the liquid ejecting head 2 from the supply-side flow path coupling section 204*a*, but the present disclosure is not particularly limited thereto. For example, the opening of the supply-side flow path coupling section 204*a* may be blocked by the blocking member 510, and the gas may be supplied into the liquid ejecting head 2 from the discharge-side flow path coupling section 204*b*. Further, the gas may be supplied into the liquid ejecting head 2 from both the supply-side flow path coupling section 204*a* and the discharge-side flow path coupling section 204*b*.

In the present embodiment, although the opening of the discharge-side flow path coupling section 204*b* is blocked by the blocking member 510, the present disclosure is not particularly limited thereto, and a blocking member may block the opening of the tube coupled to the discharge-side flow path coupling section 204*b*. Similarly, when the supply-side flow path coupling section 204*a* is blocked, the blocking member may block the opening of the tube coupled to the supply-side flow path coupling section 204*a*.

Further, in the present embodiment, in the ultrasonic cleaning step, gas is introduced through the supply-side flow path coupling section 204*a* of the liquid ejecting head 2 such that the air bubbles B are discharged from the nozzle 21, but the present disclosure is not limited thereto. For example, in the ultrasonic cleaning step, the gas may be introduced through the flow path coupling section 204 of the liquid ejecting head 2 without discharging the air bubbles from the nozzle 21. That is, the position Pg1 of the gas-liquid interface between the cleaning liquid W and the gas inside the liquid ejecting head 2 is adjusted by adjusting the pressure when the gas is pressure-fed by the pump 521 to the extent that the air bubbles B are not discharged from the nozzle 21. In this case, it is preferable that the inside of the nozzle 21 is filled with the cleaning liquid W. Even in such a configuration, as in Embodiment 1 described above, the foreign substances adhering to the nozzle 21 can be removed by performing the ultrasonic cleaning step. Particularly, by performing the ultrasonic cleaning step in a state where the nozzle 21 is filled with the cleaning liquid W, the foreign substances adhering to the nozzle 21 are easily removed. Further, in the ultrasonic cleaning step, since the gas is present in the pressure chamber 12, the transmission of the ultrasonic vibration to the vibration plate 50 and the piezoelectric element 300 through the cleaning liquid W can be suppressed, and destruction of the vibration plate 50 and the piezoelectric element 300 due to ultrasonic vibration during cleaning can be suppressed.

Modification Example 1

Figure 10:
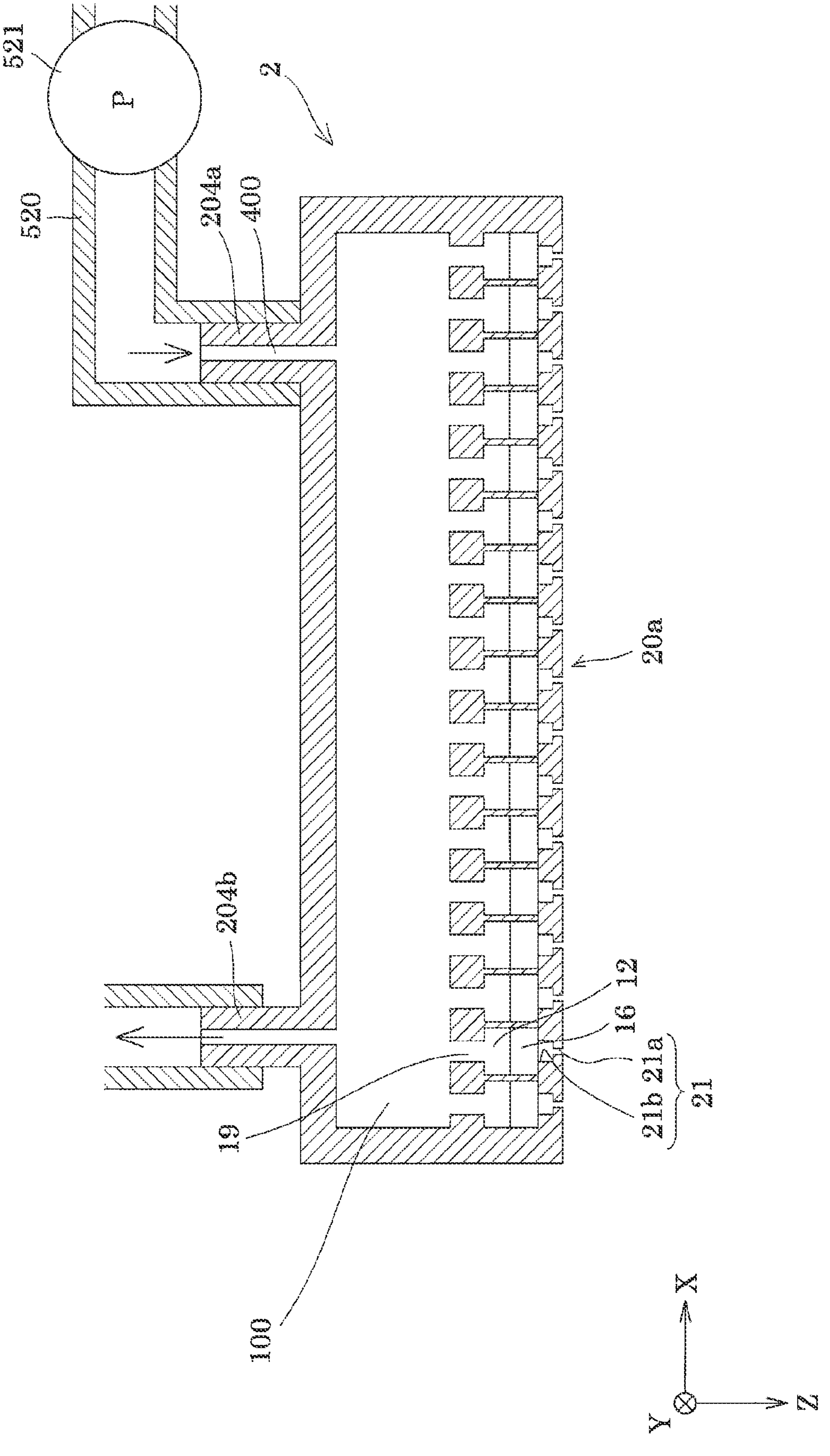
FIG. 10 is a schematic view describing a replacing step according to Modification Example 1 of Embodiment 1.
Figure 11:
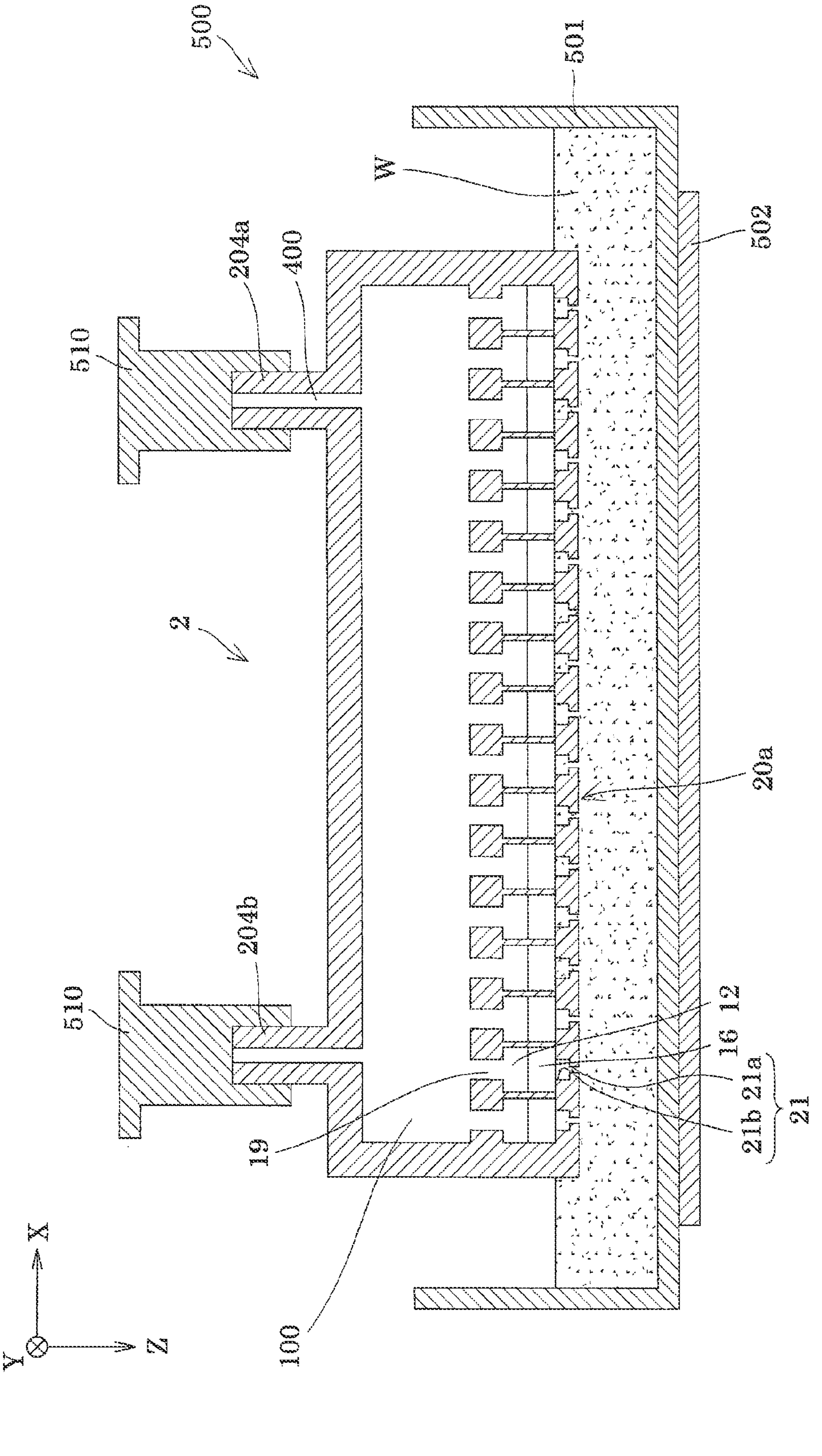
FIG. 11 is a schematic view describing an ultrasonic cleaning step according to Modification Example 1 of Embodiment 1.

FIG. 10 is a schematic view describing the replacing step of the liquid ejecting head 2 according to Modification Example 1 of Embodiment 1 of the present disclosure. FIG. 11 is a schematic view describing the impregnating step and the ultrasonic cleaning step of the liquid ejecting head 2 according to Modification Example 1 of Embodiment 1. The same reference numerals will be given to the same members as those in the above-described embodiment, and overlapping description thereof will be omitted.

As illustrated in FIG. 10, before performing the ultrasonic cleaning step, the replacing step of replacing the liquid inside the liquid ejecting head 2 with a gas by discharging the ink inside the liquid ejecting head 2 from the liquid ejecting head 2 is performed.

The replacing step is performed by, for example, introducing gas from either one of the supply-side flow path coupling section 204*a* and the discharge-side flow path coupling section 204*b* and discharging the liquid from the other. In the present embodiment, the replacing step of filling the liquid ejecting head 2 with a gas by coupling the pump 521 to the supply-side flow path coupling section 204*a* through the gas supply tube 520, by transmitting the gas toward the liquid ejecting head 2 by the pump 521, and by discharging the ink in the liquid ejecting head 2 from the discharge-side flow path coupling section 204*b*, is performed. At this time, the ink may be discharged from the nozzle 21, or the nozzle 21 may be covered with a cap or the like such that the ink is not discharged from the nozzle 21.

In addition, for example, the replacing step may be performed by sucking the ink from the nozzle 21 through a cap by a suction pump or the like in a state where the supply-side flow path coupling section 204*a* and the discharge-side flow path coupling section 204*b* are opened to the atmosphere.

Before the ultrasonic cleaning step and after the replacing step, as illustrated in FIG. 11, the impregnating step of immersing the liquid ejecting head 2 in the cleaning tank 501 such that the gas-liquid interface between the cleaning liquid W and the gas is positioned between the tip end of the nozzle 21 and the vibration plate 50 that defines the pressure chamber 12, is performed. In the present embodiment, after the replacing step, by performing the impregnating step of immersing the liquid ejecting head 2 in the cleaning tank 501 in a state where each of the supply-side flow path coupling section 204*a* and the discharge-side flow path coupling section 204*b* is blocked by the blocking member 510, the gas-liquid interface is positioned between the tip end of the nozzle 21 on the ejection surface 20*a* side and the vibration plate 50 that defines the pressure chamber 12.

In the impregnating step, it is preferable that the gas-liquid interface is located upstream of the nozzle 21, that is, between the nozzle 21 and the vibration plate 50. Accordingly, the nozzle 21 can be filled with the cleaning liquid W, and foreign substances adhering to the nozzle 21 can be removed in the ultrasonic vibration step.

After the impregnating step is performed, the ultrasonic vibrator 502 is caused to ultrasonically vibrate to perform the ultrasonic cleaning step. At this time, since at least the tip end of the nozzle 21 is immersed in the cleaning liquid W, the foreign substances adhering to at least the tip end of the nozzle 21 can be removed by ultrasonic vibration. Further, since the pressure chamber 12 is in the state where the gas is present, the transmission of the ultrasonic vibration to the vibration plate 50 and the piezoelectric element 300 through the cleaning liquid W can be suppressed, and damage of the vibration plate 50 and the piezoelectric element 300 due to ultrasonic vibration during cleaning can be suppressed.

Further, by performing the replacing step and the impregnating step before performing the ultrasonic cleaning step, it is not necessary to introduce gas into the liquid ejecting head 2 while the ultrasonic cleaning step is performed, and the ultrasonic cleaning step can be performed with a simple structure.

Also in the present modification example, similarly to Embodiment 1, in the ultrasonic cleaning step, it is preferable to detect whether or not the gas is present in the pressure chamber 12 after the replacing step and the impregnating step are performed, and when the gas is present in the pressure chamber 12, it is preferable that the ultrasonic vibrator 502 starts the ultrasonic vibration. Accordingly, when the gas is not present in the pressure chamber 12, by reducing the depth at which the liquid ejecting head 2 is immersed in the cleaning tank 501, and by performing the impregnating step again, it is possible to reduce the possibility that the ultrasonic cleaning step is performed in a state where the cleaning liquid W enters from the nozzle 21 to the vibration plate 50. The replacing step may be performed again before the impregnating step is performed again.

Modification Example 2

Figure 12:
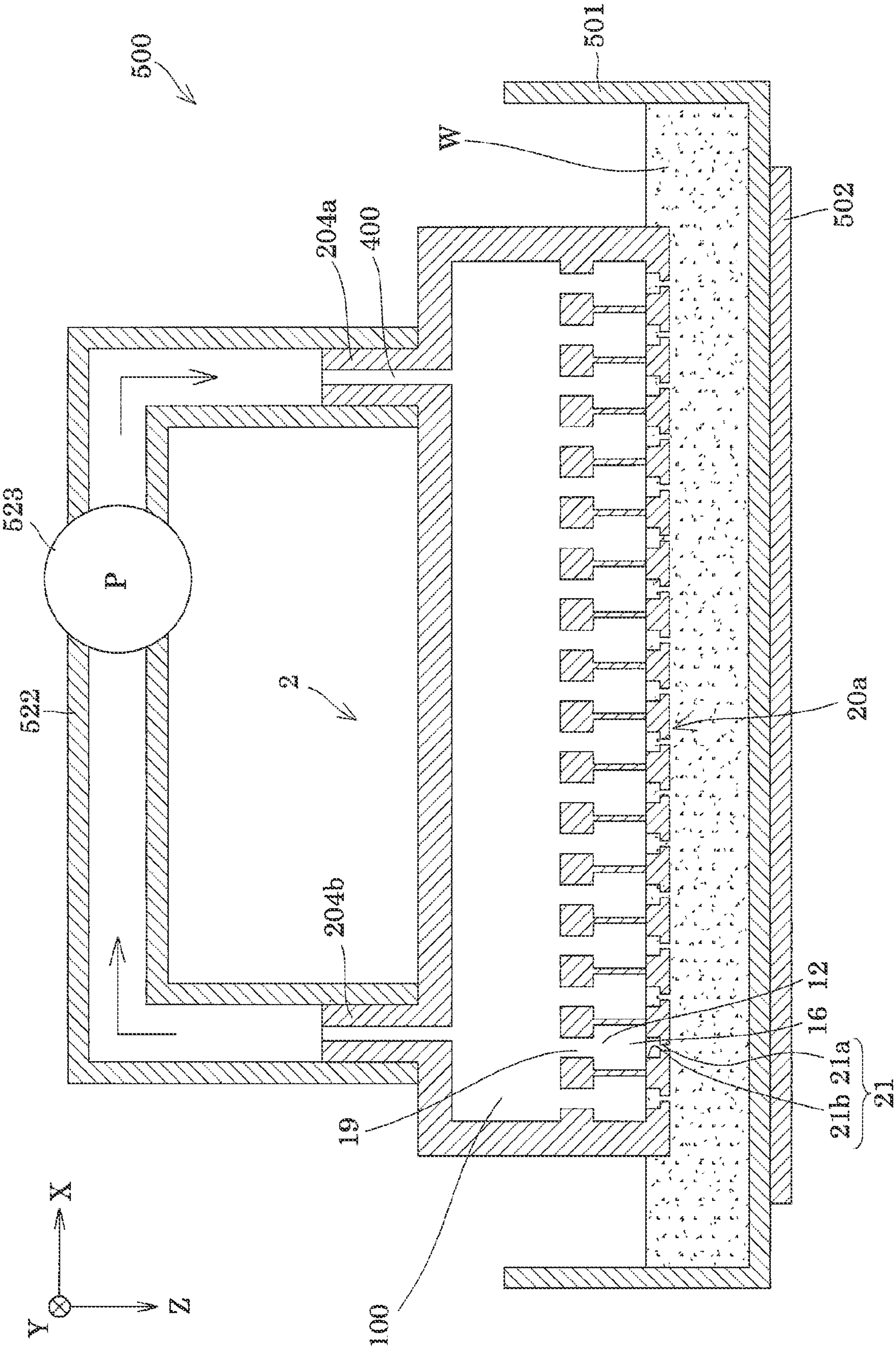
FIG. 12 is a schematic view describing an ultrasonic cleaning step according to Modification Example 2 of Embodiment 1.

FIG. 12 is a schematic view describing the ultrasonic cleaning step of the liquid ejecting head 2 according to Modification Example 2 of Embodiment 1 of the present disclosure. The same reference numerals will be given to the same members as those in the above-described embodiment, and overlapping description thereof will be omitted.

As illustrated in FIG. 12, in the ultrasonic cleaning step, the gas is introduced through the flow path coupling section 204 of the liquid ejecting head 2 while the ultrasonic vibrator 502 is ultrasonically vibrating. Specifically, the supply-side flow path coupling section 204*a* and the discharge-side flow path coupling section 204*b* are coupled by a circulation tube 522. In addition, in the middle of the circulation tube 522, a pump 523 that pressure-feeds the gas toward the supply-side flow path coupling section 204*a* is provided, and the gas discharged from the liquid ejecting head 2 through the discharge-side flow path coupling section 204*b* is introduced to the liquid ejecting head 2 through the supply-side flow path coupling section 204*a*. That is, the gas introduced and discharged to the liquid ejecting head 2 is circulated by the pump 523.

Even when the gas supplied to the liquid ejecting head 2 is circulated in this manner, similarly to Embodiment 1 described above, by supplying the gas into the flow path of the liquid ejecting head 2 at a predetermined pressure, the ultrasonic cleaning step can be performed in a state where the gas is present in the pressure chamber 12.

In addition, for example, by providing a heating unit such as a heater that heats the gas in the middle of the circulation tube 522, it is possible to heat the gas circulated and supplied to the liquid ejecting head 2 to heat the liquid ejecting head 2. Therefore, the cleaning liquid W that removes the foreign substances adhering to the nozzle 21 is heated, and the foreign substances can be easily removed.

Other Embodiments

Although each embodiment of the present disclosure was described above, the basic configuration of the present disclosure is not limited to the above-described one.

For example, in the ultrasonic cleaning step of each of the above-described embodiments, the liquid ejecting head 2 may be swung with respect to the cleaning tank 501. For example, the direction in which the liquid ejecting head 2 is swung with respect to the cleaning tank 501 is not particularly limited, and for example, the liquid ejecting head 2 may be swung vertically with respect to the cleaning tank 501 along the Z-axis direction. Further, the liquid ejecting head 2 may be swung along the XY plane defined by the X-axis and the Y-axis with respect to the cleaning tank 501, or may be swung in a direction inclined with respect to the Z-axis. By swinging the liquid ejecting head 2 with respect to the cleaning tank 501 in this manner, it is possible to suppress the biased irradiation of a part of the ultrasonic vibration and to improve the cleaning effect of the plurality of nozzles 21.

Further, in the ultrasonic cleaning step of each of the above-described embodiments, an individual cap may be used such that only the nozzle plate 20 is immersed in the cleaning liquid W without the filler 22 and the cover head 220 coming into contact with the cleaning liquid W. As a result, it is possible to suppress deterioration due to the cleaning liquid W that vibrates ultrasonically coming into contact with the filler 22, the adhesive that bonds the cover head 220, the head chip 8, and the flow path member 200, and the like in the ultrasonic cleaning step. It is needless to say that, instead of the individual caps, the filler 22, the adhesive, and the like may be protected by masking or the like.

Further, in each of the above-described embodiments, a configuration in which the head chip 8 has the communication plate 15 is exemplified, but the present disclosure is not particularly limited thereto. The head chip 8 may be configured such that the nozzle 21 directly communicates with the pressure chamber 12. Even in the liquid ejecting head 2 having the head chip 8 having such a configuration, by performing the ultrasonic cleaning step of ultrasonically vibrating the cleaning liquid W in the cleaning tank 501 by the ultrasonic vibrator 502 in a state where the nozzle 21 is immersed in the cleaning liquid W in the cleaning tank 501 and in a state where a gas is present in the pressure chamber 12, foreign substances adhering to the nozzle 21 can be removed, and damage to the vibration plate 50 and the piezoelectric element 300 due to ultrasonic vibration can be suppressed.

In the present embodiment, as the liquid ejecting apparatus 1, a so-called serial-type ink jet type recording apparatus that performs printing by reciprocating the liquid ejecting head 2 along the Y-axis direction is exemplified, but the present disclosure is not particularly limited thereto. For example, the present disclosure can also be applied to a so-called line-type ink jet type recording apparatus that fixes the liquid ejecting head 2 and performs printing only by moving the medium S along the X-axis direction.

ADDITIONAL NOTES

From the aspects exemplified above, for example, the following configuration can be ascertained.

According to Aspect 1 which is a preferred aspect, there is provided a method for cleaning a liquid ejecting head including a nozzle plate in which a nozzle for ejecting a liquid is formed, a pressure chamber communicating with the nozzle, a vibration plate that defines a part of the pressure chamber, and a piezoelectric element that is laminated on the vibration plate, the method including: an ultrasonic cleaning step of ultrasonically vibrating a cleaning liquid in a cleaning tank by an ultrasonic vibrator in a state where the nozzle is immersed in the cleaning liquid in the cleaning tank and in a state where a gas is present in the pressure chamber. According to this, it is easy to remove the foreign substances adhering to the nozzle by the cleaning liquid obtained by the ultrasonic vibration, and by performing this process in a state where the gas is present in the pressure chamber, transmission of ultrasonic vibration from the cleaning liquid to the vibration plate and the piezoelectric element can be suppressed, and damage to the vibration plate and the piezoelectric element due to ultrasonic vibration can be suppressed.

In the method for cleaning a liquid ejecting head according to Aspect 2, which is a specific example of Aspect 1, in which the liquid ejecting head includes a flow path coupling section for coupling an outside of the liquid ejecting head and a flow path inside the liquid ejecting head, in the ultrasonic cleaning step, the gas is introduced through the flow path coupling section of the liquid ejecting head while the ultrasonic vibrator is ultrasonically vibrating. According to this, by introducing the gas into the liquid ejecting head, it is possible to suppress the filling of the pressure chamber with the cleaning liquid.

According to Aspect 3, which is a specific example of Aspect 2, in the ultrasonic cleaning step, the gas is introduced through the flow path coupling section of the liquid ejecting head in such a manner that air bubbles are discharged from the nozzle while the ultrasonic vibrator is ultrasonically vibrating. According to this, by constantly discharging the air bubbles from the nozzle, it is possible to further reduce a concern that the pressure chamber is filled with the cleaning liquid. Further, advanced pressure adjustment for adjusting the position of the gas-liquid interface between the cleaning liquid and the gas inside the liquid ejecting head is not necessary. Further, when air bubbles are generated around the ejection surface, the standing wave transmitted through the cleaning liquid can be attenuated by the ultrasonic vibration, and thus the ultrasonic vibration is less likely to be transmitted to the ejection surface, and damage to the vibration plate and the piezoelectric element due to the ultrasonic vibration can be suppressed.

According to Aspect 4, which is a specific example of Aspect 2, in the ultrasonic cleaning step, the gas is introduced through the flow path coupling section of the liquid ejecting head in such a manner that air bubbles are not discharged from the nozzle while the ultrasonic vibrator is ultrasonically vibrating. According to this, since the inside of the nozzle is filled with the gas, it is easy to remove the foreign substances adhering to the nozzle.

According to Aspect 5, which is a specific example of Aspect 1, a replacing step of replacing a liquid in the liquid ejecting head with a gas by discharging the liquid in the liquid ejecting head from the liquid ejecting head, before performing the ultrasonic cleaning step; and an impregnating step of immersing the liquid ejecting head in the cleaning tank such that a gas-liquid interface between the cleaning liquid and the gas is positioned between a tip end of the nozzle and the vibration plate that defines the pressure chamber, before the ultrasonic cleaning step and after the replacing step, are further provided. According to this, since it is not necessary to introduce gas into the liquid ejecting head during the cleaning step, the ultrasonic cleaning step can be performed with a simple structure.

According to Aspect 6, which is a specific example of Aspect 5, the impregnating step is performed such that the gas-liquid interface is positioned between the nozzle and the vibration plate. According to this, the nozzle can be filled with the cleaning liquid, and the foreign substances adhering to the nozzle can be cleaned more reliably.

According to Aspect 7, which is a specific example of Aspect 1, in the ultrasonic cleaning step, it is detected whether or not the gas is present in the pressure chamber, and when the gas is present in the pressure chamber, the ultrasonic vibrator starts ultrasonic vibration. According to this, by starting the ultrasonic vibration when the gas is present in the pressure chamber, the ultrasonic vibration does not start in a state where the cleaning liquid or the liquid is present in the pressure chamber, and transmission of ultrasonic vibration to the vibration plate and the piezoelectric element can be suppressed, and damage to the vibration plate and the piezoelectric element due to ultrasonic vibration can be more reliably suppressed.

According to Aspect 8, which is a specific example of Aspects 1 to 7, the piezoelectric element includes a thin film piezoelectric body. According to this, even in the liquid ejecting head having the piezoelectric element including the thin film piezoelectric body that is easily broken by ultrasonic vibration, it is possible to perform cleaning by suppressing damage to the vibration plate and the piezoelectric element.

What is claimed is:

1. A method for cleaning a liquid ejecting head including a nozzle plate in which a nozzle configured to eject a liquid is formed, a pressure chamber communicating with the nozzle, a vibration plate that defines a part of the pressure chamber, and a piezoelectric element that is laminated on the vibration plate, the method comprising:

an ultrasonic cleaning step of ultrasonically vibrating a cleaning liquid in a cleaning tank by an ultrasonic vibrator in a state where the nozzle is immersed in the cleaning liquid in the cleaning tank and in a state where a gas is present in the pressure chamber.

2. The method for cleaning a liquid ejecting head according to claim 1, in which the liquid ejecting head includes a flow path coupling section for coupling an outside of the liquid ejecting head and a flow path inside the liquid ejecting head, Wherein in the ultrasonic cleaning step, the gas is introduced through the flow path coupling section of the liquid ejecting head while the ultrasonic vibrator is ultrasonically vibrating.

3. The method for cleaning a liquid ejecting head according to claim 2, wherein in the ultrasonic cleaning step, the gas is introduced through the flow path coupling section of the liquid ejecting head in such a manner that air bubbles are discharged from the nozzle while the ultrasonic vibrator is ultrasonically vibrating.

4. The method for cleaning a liquid ejecting head according to claim 2, wherein in the ultrasonic cleaning step, the gas is introduced through the flow path coupling section of the liquid ejecting head in such a manner that air bubbles are not discharged from the nozzle while the ultrasonic vibrator is ultrasonically vibrating.

5. The method for cleaning a liquid ejecting head according to claim 1, further comprising:

a replacing step of replacing a liquid in the liquid ejecting head with a gas by discharging the liquid in the liquid ejecting head from the liquid ejecting head, before performing the ultrasonic cleaning step; and an impregnating step of immersing the liquid ejecting head in the cleaning tank such that a gas-liquid interface between the cleaning liquid and the gas is positioned between a tip end of the nozzle and the vibration plate that defines the pressure chamber, before the ultrasonic cleaning step and after the replacing step.

6. The method for cleaning a liquid ejecting head according to claim 5, wherein the impregnating step is performed such that the gas-liquid interface is positioned between the nozzle and the vibration plate.

7. The method for cleaning a liquid ejecting head according to claim 1, wherein in the ultrasonic cleaning step, it is detected whether or not the gas is present in the pressure chamber, and when the gas is present in the pressure chamber, the ultrasonic vibrator starts ultrasonic vibration.

8. The method for cleaning a liquid ejecting head according to claim 1, wherein the piezoelectric element includes a thin film piezoelectric body.

9. The method for cleaning a liquid ejecting head according to claim 1, wherein the ultrasonic cleaning step is performed in a state where the vibration plate does not directly contact the cleaning liquid in the cleaning tank due to the presence of the gas in the pressure chamber.

* * * * *